US012602749B2

(12) United States Patent
Yang

(10) Patent No.: US 12,602,749 B2
(45) Date of Patent: Apr. 14, 2026

(54) PARAMETER OPTIMIZING METHOD OF NEURAL NETWORK AND COMPUTING APPARATUS

(71) Applicant: GENESYS LOGIC, INC., New Taipei City (TW)

(72) Inventor: Chuan-Yue Yang, New Taipei City (TW)

(73) Assignee: GENESYS LOGIC, INC., New Taipei City (TW)

( * ) Notice: Subject to any disclaimer, the term of this patent is extended or adjusted under 35 U.S.C. 154(b) by 338 days.

(21) Appl. No.: 18/408,601

(22) Filed: Jan. 10, 2024

(65) Prior Publication Data

US 2024/0296520 A1 Sep. 5, 2024

Related U.S. Application Data

(60) Provisional application No. 63/450,080, filed on Mar. 5, 2023.

(30) Foreign Application Priority Data

Oct. 13, 2023 (TW) ................................. 112139213

(51) Int. Cl.
*G06T 5/60* (2024.01)
(52) U.S. Cl.
CPC ...... *G06T 5/60* (2024.01); *G06T 2207/20016* (2013.01); *G06T 2207/20081* (2013.01); *G06T 2207/20084* (2013.01)
(58) Field of Classification Search
USPC ........................................................ 382/100
See application file for complete search history.

(56) References Cited

U.S. PATENT DOCUMENTS

| | | | | |
|---|---|---|---|---|
| 8,943,117 | B1 * | 1/2015 | Torosyan | G06F 17/14 |
| | | | | 708/319 |
| 10,311,342 | B1 * | 6/2019 | Farhadi | G06N 3/084 |
| 11,468,316 | B2 * | 10/2022 | Backhus | G06N 3/08 |
| 2020/0372340 | A1 | 11/2020 | Lee et al. | |

(Continued)

FOREIGN PATENT DOCUMENTS

| | | |
|---|---|---|
| CN | 112906867 | 6/2021 |
| CN | 113658115 | 11/2021 |

(Continued)

OTHER PUBLICATIONS

"Office Action of Taiwan Counterpart Application", issued on Apr. 17, 2024, p. 1-p. 4.

*Primary Examiner* — Gabriel I Garcia
(74) *Attorney, Agent, or Firm* — JCIPRNET

(57) ABSTRACT

A parameter optimizing method of a neural network and a computing apparatus are provided. A shared filter is obtained, and the shared filter includes multiple shared weights. Those shared weights are assigned to multiple sub-filters. Each sub-filter corresponds to one of multiple channels. Each sub-filter includes multiple sub-weights. The size of each sub-filter is smaller than or equal to the size of the shared filter. The sub-weights of each sub-filter are generated according to the assigned shared weight. The sub-filters of those channels are used to be computed with one or more pieces of input data respectively. Thereby, checkerboard artifacts may be reduced or avoided.

22 Claims, 31 Drawing Sheets

(56) References Cited

U.S. PATENT DOCUMENTS

| | | | |
|---|---|---|---|
| 2021/0073635 A1 | 3/2021 | Sasagawa | |
| 2022/0237513 A1 | 7/2022 | He et al. | |
| 2023/0177316 A1* | 6/2023 | Asada | G06F 17/16 |
| | | | 706/22 |

FOREIGN PATENT DOCUMENTS

| | | | | |
|---|---|---|---|---|
| CN | 115631127 | 1/2023 | | |
| WO | WO-2021120577 A1 * | 6/2021 | | G06F 18/21 |

* cited by examiner

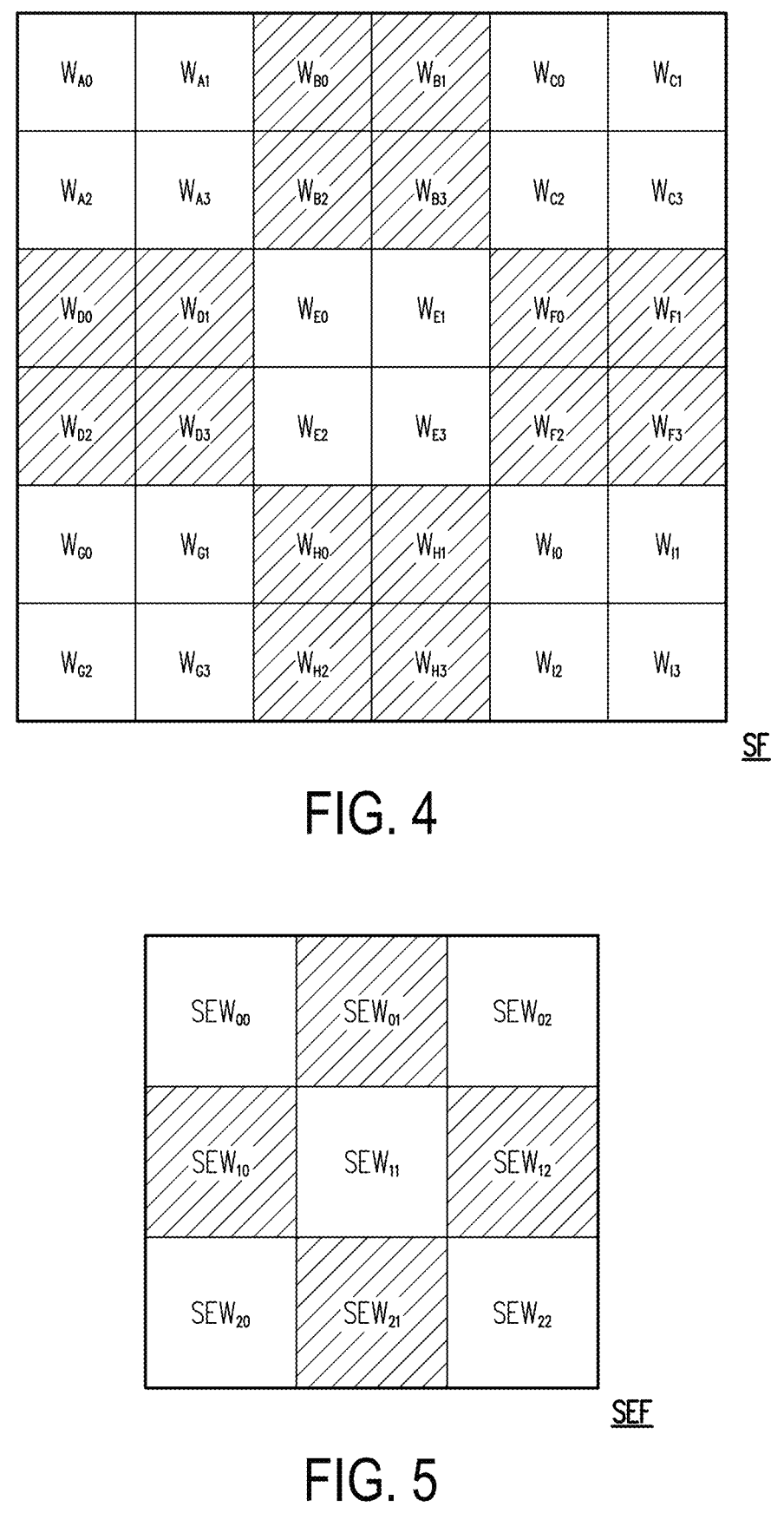

| $W_{A0}$ | $W_{A1}$ | $W_{B0}$ | $W_{B1}$ | $W_{C0}$ | $W_{C1}$ |
|---|---|---|---|---|---|
| $W_{A2}$ | $W_{A3}$ | $W_{B2}$ | $W_{B3}$ | $W_{C2}$ | $W_{C3}$ |
| $W_{D0}$ | $W_{D1}$ | $W_{E0}$ | $W_{E1}$ | $W_{F0}$ | $W_{F1}$ |
| $W_{D2}$ | $W_{D3}$ | $W_{E2}$ | $W_{E3}$ | $W_{F2}$ | $W_{F3}$ |
| $W_{G0}$ | $W_{G1}$ | $W_{H0}$ | $W_{H1}$ | $W_{I0}$ | $W_{I1}$ |
| $W_{G2}$ | $W_{G3}$ | $W_{H2}$ | $W_{H3}$ | $W_{I2}$ | $W_{I3}$ |

| $SEW_{00}$ | $SEW_{01}$ | $SEW_{02}$ |
|---|---|---|
| $SEW_{10}$ | $SEW_{11}$ | $SEW_{12}$ |
| $SEW_{20}$ | $SEW_{21}$ | $SEW_{22}$ |

SEF

FIG. 5

```
┌──────────────────────────────────────────────┐
│  define a plurality of areas of a shared       │──S610
│  filter according to the size of a sub-filter  │
└──────────────────────────────────────────────┘
                      │
                      ▼
┌──────────────────────────────────────────────┐
│  map sub-filters to the shared filter to       │──S620
│  generate a mapping result                     │
└──────────────────────────────────────────────┘
                      │
                      ▼
┌──────────────────────────────────────────────┐
│  assign shared weights according to the        │──S630
│  mapping result                                │
└──────────────────────────────────────────────┘
```

FIG. 6

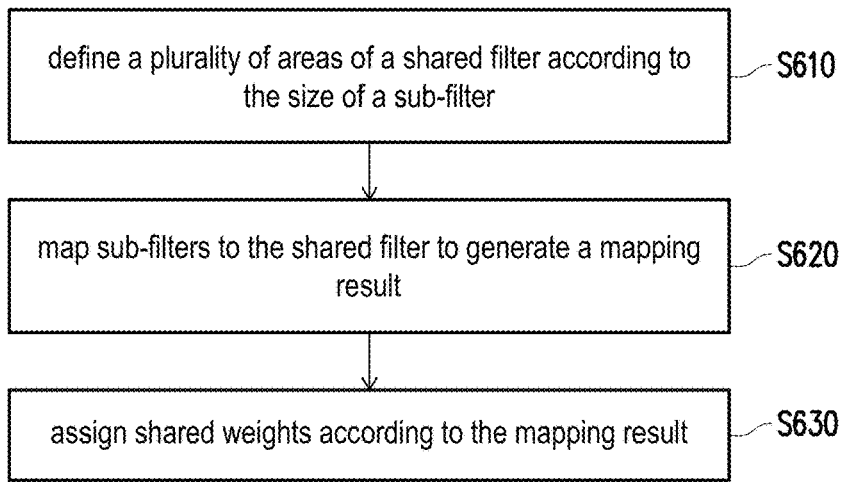

FIG. 8C $STW_{100}\begin{cases} W_{A0} \\ W_{A1} \\ W_{A2} \\ W_{A3} \end{cases}$  $STW_{101}\begin{cases} W_{B0} \\ W_{B1} \\ W_{B2} \\ W_{B3} \end{cases}$  $STW_{102}\begin{cases} W_{C0} \\ \\ \\ W_{C2} \end{cases}$  $STW_{110}\begin{cases} W_{D0} \\ W_{D1} \\ W_{D2} \\ W_{D3} \end{cases}$  $STW_{111}\begin{cases} W_{E0} \\ W_{E1} \\ W_{E2} \\ W_{E3} \end{cases}$ $STW_{112}\begin{cases} W_{F0} \\ \\ W_{F2} \end{cases}$  $STW_{120}\begin{cases} W_{G0} \\ \\ W_{G1} \end{cases}$  $STW_{121}\begin{cases} W_{H0} \\ \\ W_{H1} \end{cases}$  $STW_{122}\begin{cases} \\ W_{I0} \\ \end{cases}$

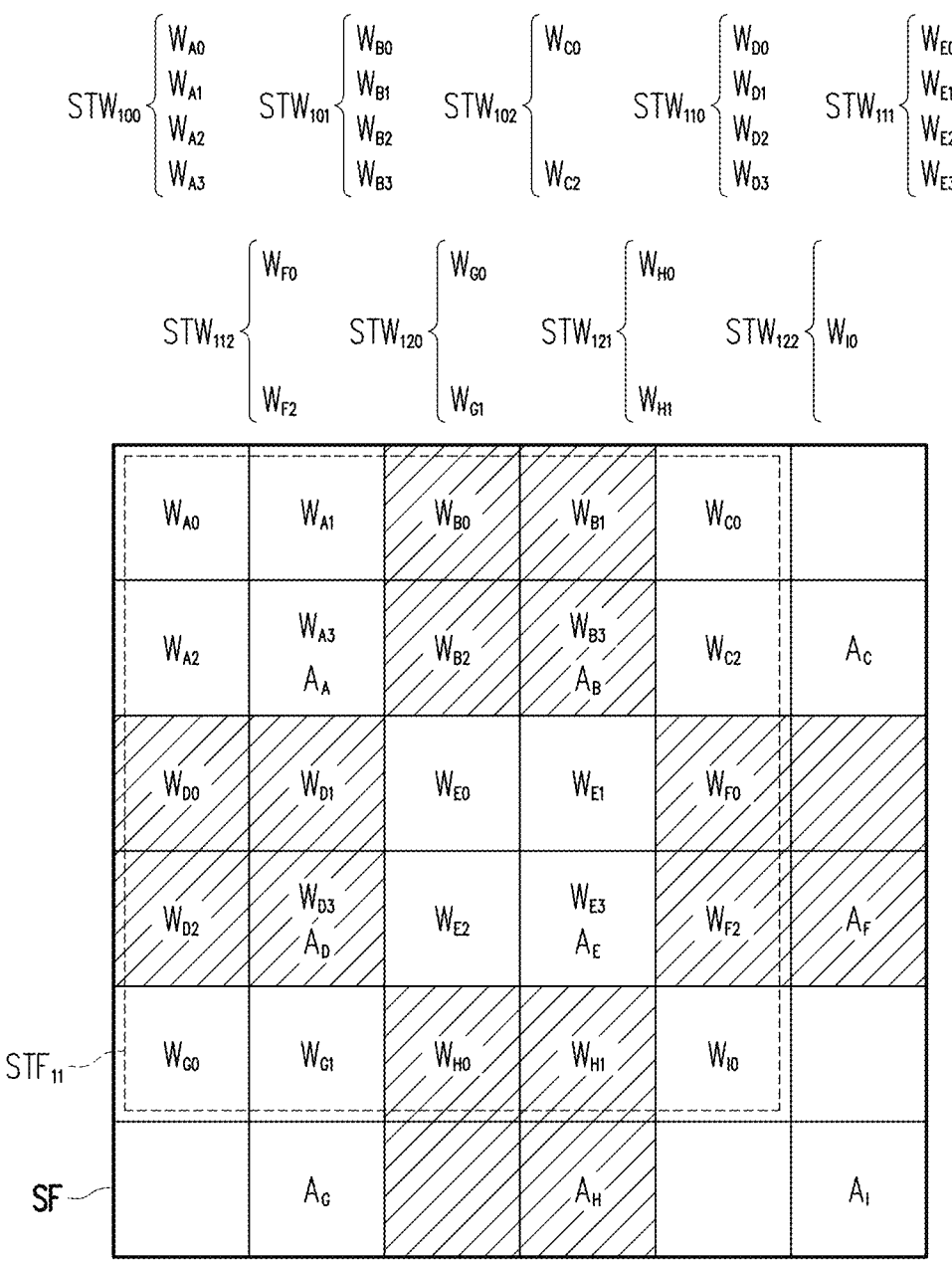

IFM21

$Y_{0,0}$
$Y_{0,1}$
$Y_{1,0}$
$Y_{1,1}$

IFM22

IFM31

FIG. 18B scaling
(FIG. 17C)

(FIG. 17B)

ground truth packing+scaling
(FIG. 17A)

pack
(FIG. 17D)

packing+scaling+shared filter
(FIG. 17D+FIG. 16A first convolution
operation)

PARAMETER OPTIMIZING METHOD OF NEURAL NETWORK AND COMPUTING APPARATUS

CROSS-REFERENCE TO RELATED APPLICATION

This application claims the priority benefits of U.S. provisional application Ser. No. 63/450,080, filed on Mar. 5, 2023, and Taiwan application serial no. 112139213, filed on Oct. 13, 2023. The entirety of each of the above-mentioned patent applications is hereby incorporated by reference herein and made a part of this specification.

BACKGROUND

Technical Field

The disclosure relates to a machine learning technology, and particularly relates to a parameter optimizing method of a neural network and a computing apparatus.

Description of Related Art

Neural network is an important subject in the field of artificial intelligence (AI), which makes decisions by simulating the operation of human brain cells. There are many neurons in human brain cells, and these neurons are connected to one another through synapses. Each neuron receives a signal through a synapse, and the output obtained by transforming the signal is then transmitted to another neuron. Neurons have different transformation abilities, and through the signal transmission and transformation, humans have the ability to think and judge. A neural network gains the corresponding ability based on such an operation.

Neural network is commonly used in image processing, which includes, for example, noise removal, sharpening, or high dynamic range (HDR) processing. However, the image output using a neural network may be distorted. For example, FIG. 1 is a view illustrating an example of a checkerboard artifact. Referring to FIG. 1, an artificial checkerboard pattern may be found in a magnified area of the image.

Today's technology can avoid checkerboard artifacts through additional operations. For example, the feature map may be resized before the convolution operation for up-sampling. Alternatively, additional convolution operations may be added after the convolution operation for up-sampling. In addition, today's technology provides other means for reducing checkerboard artifacts. For example, the channels used for neighboring pixels may be regarded as part of the input feature map. Alternatively, the size of the kernel divided by stride may be determined.

SUMMARY

The disclosure provides a parameter optimizing method of a neural network and a computing apparatus, which effectively reduces or avoids the output of a checkerboard pattern.

A parameter optimizing method of a neural network according to an embodiment of the disclosure includes (but is not limited to): obtaining a shared filter, which includes multiple shared weights; assigning the shared weights to multiple sub-filters, in which each of the sub-filters corresponds to one of multiple channels, each of the sub-filters includes multiple sub-weights, and a size of each of the sub-filters is smaller than or equal to a size of the shared filter; generating the sub-weights of each of the sub-filters according to the assigned shared weights; and performing a computation with one or more pieces of input data by using the sub-filters of the channels respectively.

A computing apparatus according to an embodiment of the disclosure includes (but is not limited to) a storage and a processor. The storage is configured to store a program code. The processor is coupled to the storage. The processor is configured to load and execute the program code to: obtain a shared filter; assign the shared weights to multiple sub-filters; generate the sub-weights of each of the sub-filters according to the assigned shared weights; and perform a computation with one or more pieces of input data by using the sub-filters of the channels respectively. The shared filter includes multiple shared weights. Each of the sub-filters corresponds to one of multiple channels. Each of the sub-filters includes multiple sub-weights. A size of each of the sub-filters is smaller than or equal to a size of the shared filter.

Based on the above, the parameter optimizing method of a neural network and the computing apparatus according to the embodiments of the disclosure allow multiple sub-filters to share the shared weights of a shared filter and enable all output data to retain the characteristics of the input data, thereby avoiding checkerboard artifacts caused by up-sampling.

In order to make the above-mentioned and other features and advantages of the disclosure easier to understand, exemplary embodiments are described in detail hereinafter with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 is a schematic diagram of a shared filter according to an embodiment of the disclosure.

FIG. 5 is a schematic diagram of a sub-filter according to an embodiment of the disclosure.

FIG. 6 is a flowchart illustrating filter mapping according to an embodiment of the disclosure.

FIG. 7 is a schematic diagram of a shared filter and areas thereof according to an embodiment of the disclosure.

FIG. 8A to FIG. 8D are schematic diagrams illustrating mapping of sub-filters to a shared filter according to an embodiment of the disclosure.

FIG. 9A to FIG. 9D are schematic diagrams illustrating assignment of shared weights according to an embodiment of the disclosure.

FIG. 10A to FIG. 10D are schematic diagrams illustrating assignment of shared weights according to another embodiment of the disclosure.

FIG. 18B is a view illustrating an evaluation result after 900 epochs of training according to an embodiment of the disclosure.

DETAILED DESCRIPTION OF DISCLOSED EMBODIMENTS

Figure 1:
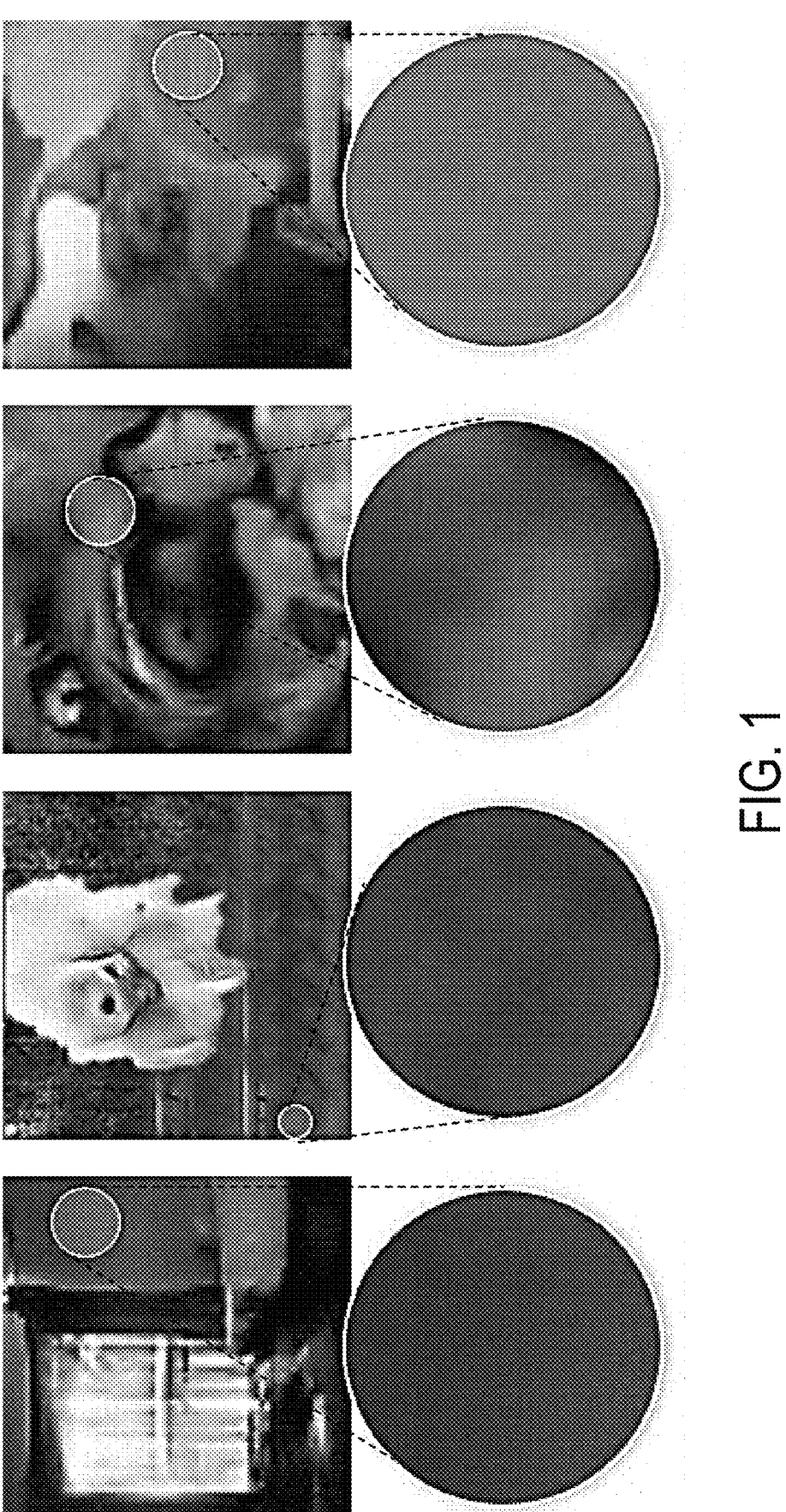
FIG. 1 is a view illustrating an example of a checkerboard artifact.
Figure 2:
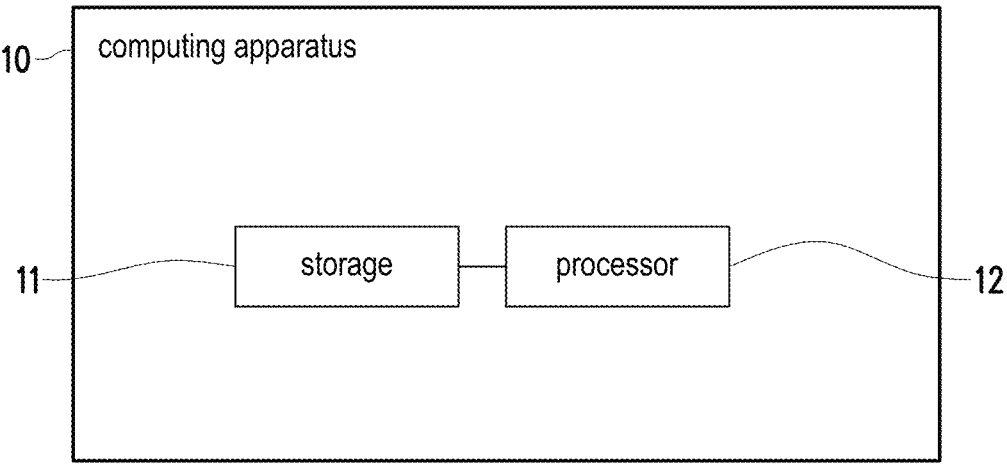
FIG. 2 is a block diagram of a computing apparatus according to an embodiment of the disclosure.

FIG. 2 is a block diagram of a computing apparatus 10 according to an embodiment of the disclosure. Referring to FIG. 2, the computing apparatus 10 includes (but is not limited to) a storage 11 and a processor 12. The computing apparatus 10 may be a smartphone, a tablet, a computer device, a server, a wearable device, a smart home appliance, or other types of electronic devices.

The storage 11 may be any type of fixed or removable random access memory (RAM), read only memory (ROM), flash memory, traditional hard disk drive (HDD), solid-state drive (SSD), or similar components. In an embodiment, the storage 11 is configured to store program codes, software modules, configurations, data and/or files (for example, images, feature maps, weights, or parameters, which will be described in detail in subsequent embodiments).

The processor 12 is coupled to the storage 11. The processor 12 may be a central processing unit (CPU), a graphic processing unit (GPU), a programmable general-purpose or special-purpose microprocessor, a digital signal processor (DSP), a programmable controller, a Field Programmable Gate Array (FPGA), an application-specific integrated circuit (ASIC), a neural network accelerator, other similar components, or a combination of the above components. In an embodiment, the processor 12 is configured to execute all or some of the operations of the computing apparatus 10 and is capable of loading and executing the program codes, software modules, files and/or data stored in the storage 11.

Hereinafter, the method according to an embodiment of the disclosure will be described with reference to the devices, components, and modules in the computing apparatus 10. Each step of the method may be adjusted as appropriate, and is not limited thereto.

Figure 3:
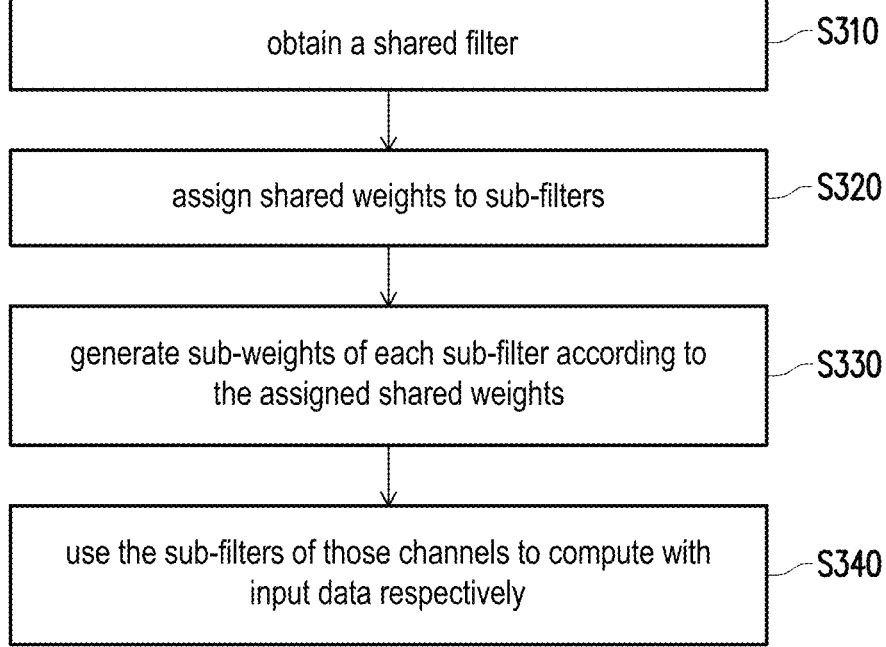
FIG. 3 is a flowchart of a parameter optimizing method of a neural network according to an embodiment of the disclosure.

FIG. 3 is a flowchart of a parameter optimizing method of a neural network according to an embodiment of the disclosure. Referring to FIG. 3, the processor 12 obtains a shared filter (step S310). Specifically, the shared filter includes multiple shared weights. For example, FIG. 4 is a schematic diagram of a shared filter SF according to an embodiment of the disclosure. Referring to FIG. 4, the size of the shared filter SF in this embodiment is, for example, 6×6 (height×width). Therefore, the shared filter SF includes, for example, 36 shared weights $W_{A0}$ to $W_{A3}$, $W_{B0}$ to $W_{B3}$, $W_{C0}$ to $W_{C3}$, $W_{D0}$ to $W_{D3}$, $W_{E0}$ to $W_{E3}$, $W_{F0}$ to $W_{F3}$, $W_{G0}$ to $W_{G3}$, $W_{H0}$ to $W_{H3}$, and $W_{I0}$ to $W_{I3}$. These shared weights $W_{A0}$ to $W_{I3}$ may be trained or initial weights. It should be noted that the size shown in FIG. 4 is merely illustrative, which may be adjusted as required.

Referring to FIG. 3, the processor 12 assigns the shared weights to multiple sub-filters (step S320). Specifically, each sub-filter corresponds to one of multiple channels. For example, if four channels are defined, there are four corresponding sub-filters. Nevertheless, the number of channels is not limited thereto. The size (or dimensions) of each sub-filter is smaller than or equal to the size of the shared filter. The sizes (or dimensions) of the shared filter and sub-filters refer to the number of weight values included therein. For example, the size of a sub-filter is 3×3 (height×width), which means that the sub-filter includes 9 weight values, and the size of the shared filter is 6×6 (height×width), which means that the shared filter includes 36 weight values, but not limited thereto.

In addition, each sub-filter includes multiple sub-weights. For example, FIG. 5 is a schematic diagram of a sub-filter SEF according to an embodiment of the disclosure. Referring to FIG. 5, the size of the sub-filter SEF corresponding to a certain channel is 3×3 (height×width). Therefore, the sub-filter SEF includes 9 sub-weights $SEW_{00}$ to $SEW_{02}$, $SEW_{10}$ to $SEW_{12}$, and $SEW_{20}$ to $SEW_{22}$. The values of these sub-weights $SEW_{00}$ to $SEW_{22}$ are determined based on the assigned shared weights, which will be described in detail in subsequent embodiments. It should be noted that the size shown in FIG. 5 is merely illustrative, which may be adjusted as required.

FIG. 6 is a flowchart illustrating filter mapping according to an embodiment of the disclosure. FIG. 7 is a schematic diagram of the shared filter SF and areas $A_A$ to $A_H$ thereof according to an embodiment of the disclosure. Referring to FIG. 6, the processor 12 may define multiple areas of the shared filter according to the size of each sub-filter (step S610). For example, the size of the sub-filter SEF shown in FIG. 5 is 3×3, and the processor 12 may define multiple areas $A_A$ to $A_H$ of the shared filter shown in FIG. 7 according to the size of the sub-filter. Specifically, the number of sub-weights included in each sub-filter may be the same as the number of areas defined in the shared filter, but not limited thereto. In other embodiments, the areas of the shared filter may also be defined based on the size of input data (the data is, for example, feature maps) or other appropriate methods. In this specification, the data is described in the form of feature maps as an example, but not limited thereto. Referring to FIG. 5 and FIG. 7, taking the sub-filter SEF in FIG. 5 as an example, the number of sub-weights $SEW_{00}$ to $SEW_{22}$ of the sub-filter SEF is 9, and the number of areas $A_A$ to $A_H$ in the shared filter SF is 9. In an embodiment, in terms of positional relationship, $SEW_{00}$ corresponds to the area $A_A$, $SEW_{01}$ corresponds to the area $A_B$, $SEW_{02}$ corresponds to the area $A_C$, $SEW_{10}$ corresponds to the area $A_D$, $SEW_{11}$ corresponds to the area $A_E$, $SEW_{12}$ corresponds to the area $A_F$, $SEW_{20}$ corresponds to the area $A_G$, $SEW_{21}$ corresponds to the area $A_H$, and $SEW_{22}$ corresponds to the area $A_I$.

Taking FIG. 7 as an example, the shared weights $W_{A0}$ to $W_{A3}$ are located in the area $A_A$, the shared weights $W_{B0}$ to $W_{B3}$ are located in the area $A_B$, the shared weights $W_{C0}$ to $W_{C3}$ are located in the area $A_C$, the shared weights $W_{D0}$ to $W_{D3}$ are located in the area $A_D$, the shared weights $W_{E0}$ to $W_{E3}$ are located in the area $A_E$, the shared weights $W_{F0}$ to $W_{F3}$ are located in the area $A_F$, the shared weights $W_{G0}$ to $W_{G3}$ are located in the area $A_G$, the shared weights $W_{H0}$ to $W_{H3}$ are located in the area $A_H$, and the shared weights $W_{I0}$ to $W_{I3}$ are located in the area $A_I$. In this embodiment, different areas in the shared filter SF have different shared weight values, for example, but not limited thereto.

Further, in the shared filter SF of this embodiment, the values of the shared weights located in one area are, for example, the same. For example, the shared weights $W_{A0}$ to $W_{A3}$ located in the area $A_A$ have the same value, the shared weights $W_{B0}$ to $W_{B3}$ located in the area $A_B$ have the same value, the shared weights $W_{C0}$ to $W_{C3}$ located in the area $A_C$ have the same value, the shared weights $W_{D0}$ to $W_{D3}$ located in the area $A_D$ have the same value, the shared weights $W_{E0}$ to $W_{E3}$ located in the area $A_E$ have the same value, the shared weights $W_{F0}$ to $W_{F3}$ located in the area $A_F$ have the same value, the shared weights $W_{G0}$ to $W_{G3}$ located in the area $A_G$ have the same value, the shared weights $W_{H0}$ to $W_{H3}$ located in the area $A_H$ have the same value, and the shared weights $W_{I0}$ to $W_{I3}$ located in the area $A_I$ have the same value. In other embodiments, the values of the shared weights in one area may be set as required, which is not particularly limited here.

Referring to FIG. 6, the processor 12 of this embodiment may map multiple sub-filters to the shared filter to generate a mapping result (step S620). Specifically, the mapping result includes the area of the shared filter to which each sub-weight of each sub-filter corresponds. The range of each sub-filter mapped to the shared filter is the pixel that the sub-filter emphasizes. A mapping program includes, for example, allowing the sub-filters to obtain the corresponding weight values in the shared filter, and the weight values are, for example, values stored at corresponding addresses in a memory.

Figure 8A:
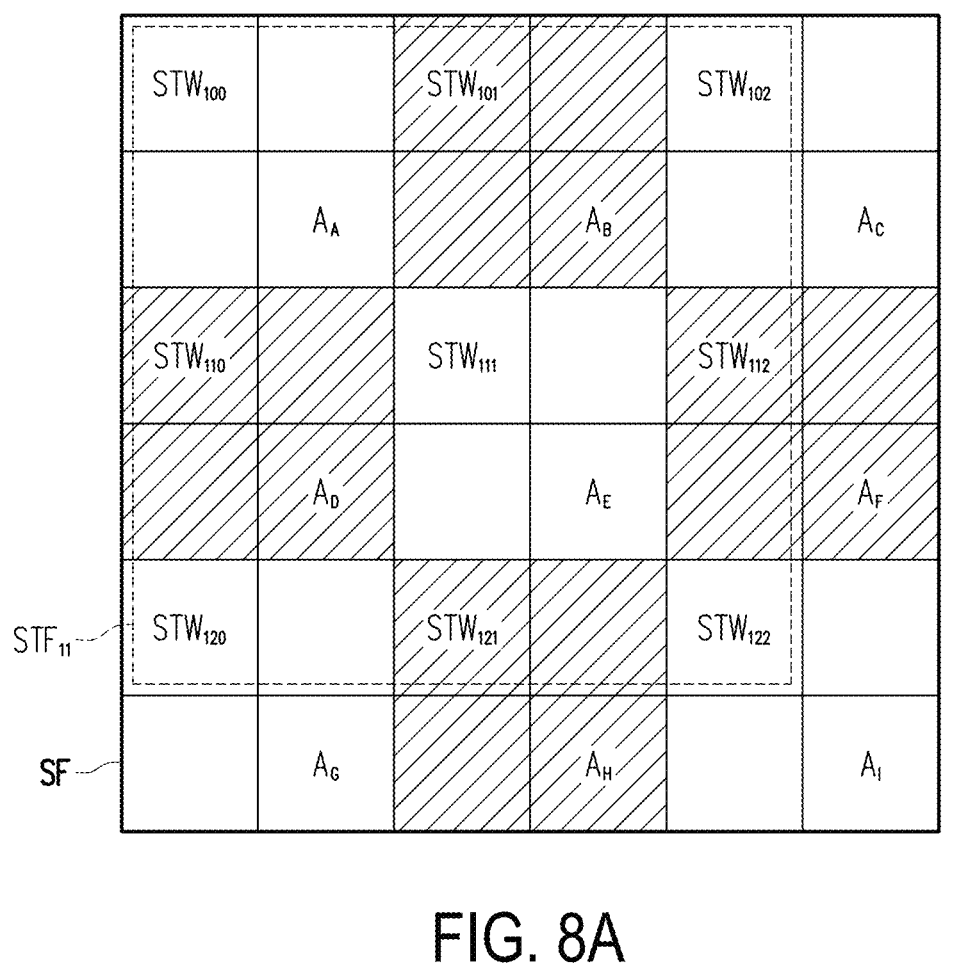
Figure 8B:
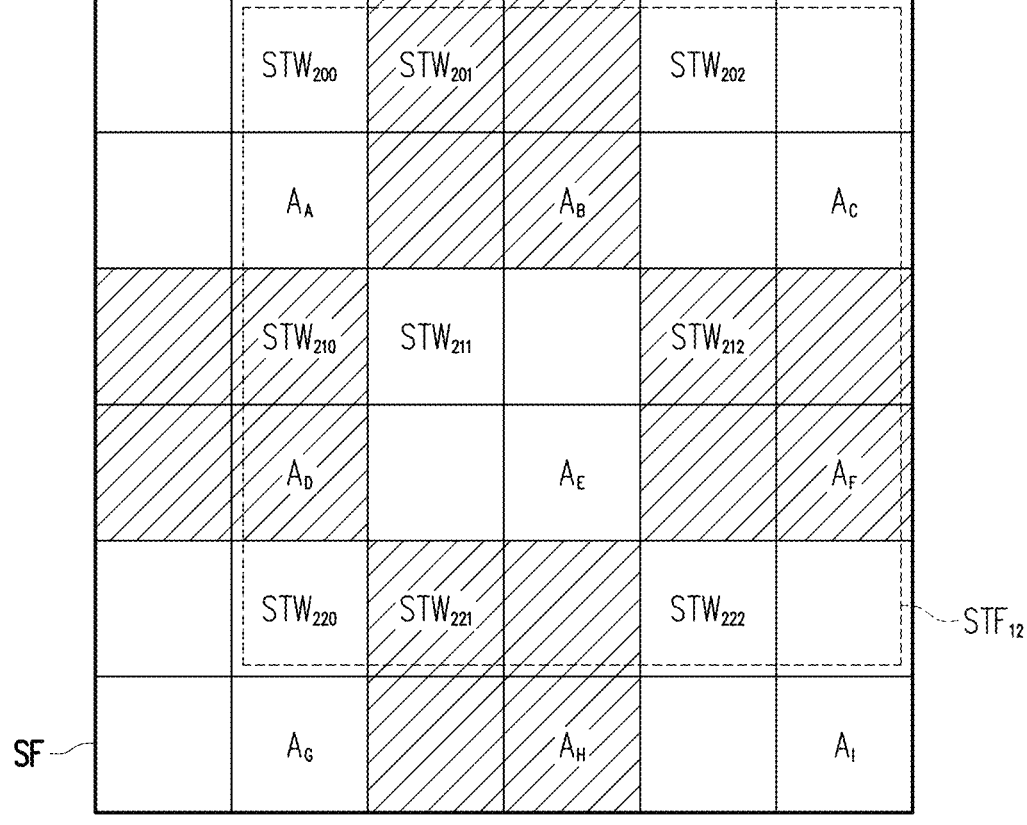

For example, FIG. 8A to FIG. 8D are schematic diagrams illustrating applying selected areas $STF_{11}$ to $STF_{14}$ to the shared filter SF to obtain the mapping relationship of each sub-filter according to an embodiment of the disclosure. Each sub-filter, for example, applies the corresponding selected area to the shared filter SF to obtain the mapping relationship of the weight value thereof. Referring to FIG. 8A, it is assumed that the size of the selected area $STF_{11}$ in FIG. 8A is 5×5, and the selected area $STF_{11}$ may be mapped to the shared filter SF with a size of 6×6 and then converted to obtain a sub-filter with a size of 3×3, for example, the same size as the sub-filter SEF in FIG. 5. For example, the selected area $STF_{11}$ in this embodiment covers and obtains 9 selected sub-weights $STW_{100}$ to $STW_{102}$, $STW_{110}$ to $STW_{112}$, and $STW_{120}$ to $STW_{122}$ corresponding to the sub-filter shown in FIG. 5. In other words, the selected area $STF_{11}$ has, for example, the selected sub-weights $STW_{100}$ to $STW_{102}$, $STW_{110}$ to $STW_{112}$, and $STW_{120}$ to $STW_{122}$ corresponding to the sub-weights $SEW_{00}$ to $SEW_{02}$, $SEW_{10}$ to $SEW_{12}$, and $SEW_{20}$ to $SEW_{22}$ of the sub-filter. If this sub-filter emphasizes the pixel in the upper left part of the bits (image), the selected sub-weight $STW_{100}$ located at the upper left corner of the selected area $STF_{11}$ is aligned toward the upper left corner of the shared filter SF, so that the selected area $STF_{11}$ occupies the areas $A_A$, $A_B$, $A_D$, and $A_E$ of the shared filter SF and part of the areas $A_C$, $A_F$, $A_G$, $A_H$, and $A_I$ of the shared filter SF. After the selected area $STF_{11}$ is applied to the shared filter, the weight values corresponding to the area $A_A$ to $A_I$ in the shared filter selected by the selected area $STF_{11}$ have the following mapping relationship. According to the relationship that one selected sub-weight of the selected area corresponds to one area of the shared filter SF, the selected sub-weight $STW_{100}$ corresponds to the area $A_A$, the selected sub-weight $STW_{101}$ corresponds to the area $A_B$, the selected sub-weight $STW_{102}$ corresponds to the area $A_C$, the selected sub-weight $STW_{110}$ corresponds to the area $A_D$, the selected sub-weight $STW_{111}$ corresponds to the area $A_E$, the selected sub-weight $STW_{112}$ corresponds to the area $A_F$, the selected sub-weight $STW_{120}$ corresponds to the area $A_G$, the selected sub-weight $STW_{121}$ corresponds to the area $A_H$, and the selected sub-weight $STW_{122}$ corresponds to the area $A_I$.

Then, referring to FIG. 8B, it is assumed that the size of the selected area $STF_{12}$ in FIG. 8B is 5×5, and the selected area $STF_{12}$ may be mapped to the shared filter SF with a size of 6×6 and then converted to obtain a sub-filter with a size of 3×3, for example, the same size as the sub-filter SEF in FIG. 5. For example, the selected area $STF_{12}$ in this embodiment covers and obtains 9 selected sub-weights $SEW_{00}$ to $SEW_{02}$, $SEW_{10}$ to $SEW_{12}$, and $SEW_{20}$ to $SEW_{22}$ corresponding to the sub-filter shown in FIG. 5. After the selected area $STF_{12}$ is applied to the shared filter, the weight values corresponding to the area $A_A$ to $A_I$ in the shared filter selected by the selected area $STF_{12}$ have the following mapping relationship. The selected area $STF_{12}$ has, for example, the selected sub-weights $STW_{200}$ to $STW_{202}$, $STW_{210}$ to $STW_{212}$, and $STW_{220}$ to $STW_{222}$ corresponding to the sub-weights $SEW_{00}$ to $SEW_{02}$, $SEW_{10}$ to $SEW_{12}$, and $SEW_{20}$ to $SEW_{22}$ of the sub-filter. If this sub-filter emphasizes the pixel in the upper right part of the bits (image), the selected sub-weight $STW_{202}$ located at the upper right corner of the selected area $STF_{12}$ is aligned toward the upper right corner of the shared filter SF, so that the selected area $STF_{12}$ occupies the areas $A_B$, $A_C$, $A_E$, and $A_F$ of the shared filter SF and part of the areas $A_A$, $A_D$, $A_G$, $A_H$, and $A_I$ of the shared filter SF. According to the relationship that one selected sub-weight of the selected area corresponds to one area of the shared filter SF, the selected sub-weights $STW_{200}$ to $STW_{222}$ correspond to the areas $A_A$ to $A_I$ respectively.

Figure 8C:
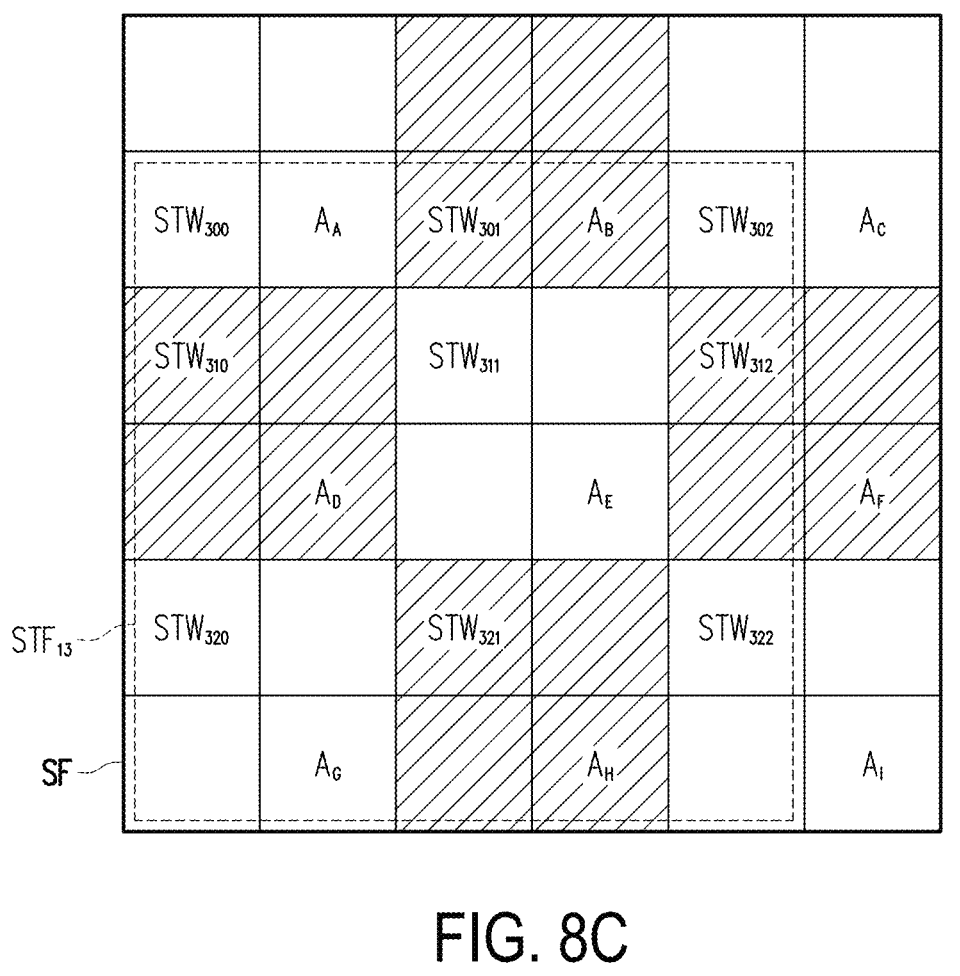

Referring to FIG. 8C, it is assumed that the size of the selected area $STF_{13}$ in FIG. 8C is 5×5, and the selected area $STF_{13}$ may be mapped to the shared filter SF with a size of 6×6 and then converted to obtain a sub-filter with a size of 3×3, for example, the same size as the sub-filter SEF in FIG. 5. For example, the selected area $STF_{13}$ in this embodiment covers and obtains 9 selected sub-weights $STW_{300}$ to $STW_{302}$, $STW_{310}$ to $STW_{312}$, and $STW_{320}$ to $STW_{322}$ corresponding to the sub-filter shown in FIG. 5. In other words, the selected area $STF_{13}$ has, for example, the selected sub-weights $STW_{300}$ to $STW_{302}$, $STW_{310}$ to $STW_{312}$, and $STW_{320}$ to $STW_{322}$ corresponding to the sub-weights $SEW_{00}$ to $SEW_{02}$, $SEW_{10}$ to $SEW_{12}$, and $SEW_{20}$ to $SEW_{22}$ of the sub-filter. If this sub-filter emphasizes the pixel in the lower left part of the bits (image), the selected sub-weight $STW_{320}$ located at the lower left corner of the selected area $STF_{13}$ is aligned toward the lower left corner of the shared filter SF, so that the selected area $STF_{13}$ occupies the areas $A_D$, $A_E$, $A_G$, and $A_H$ of the shared filter SF and part of the areas $A_A$, $A_B$, $A_C$, $A_F$, and $A_I$ of the shared filter SF. According to the relationship that one selected sub-weight of the selected area corresponds to one area of the shared filter SF, the selected sub-weights $STW_{300}$ to $STW_{322}$ correspond to the areas $A_A$ to $A_I$ respectively.

Figure 8D:
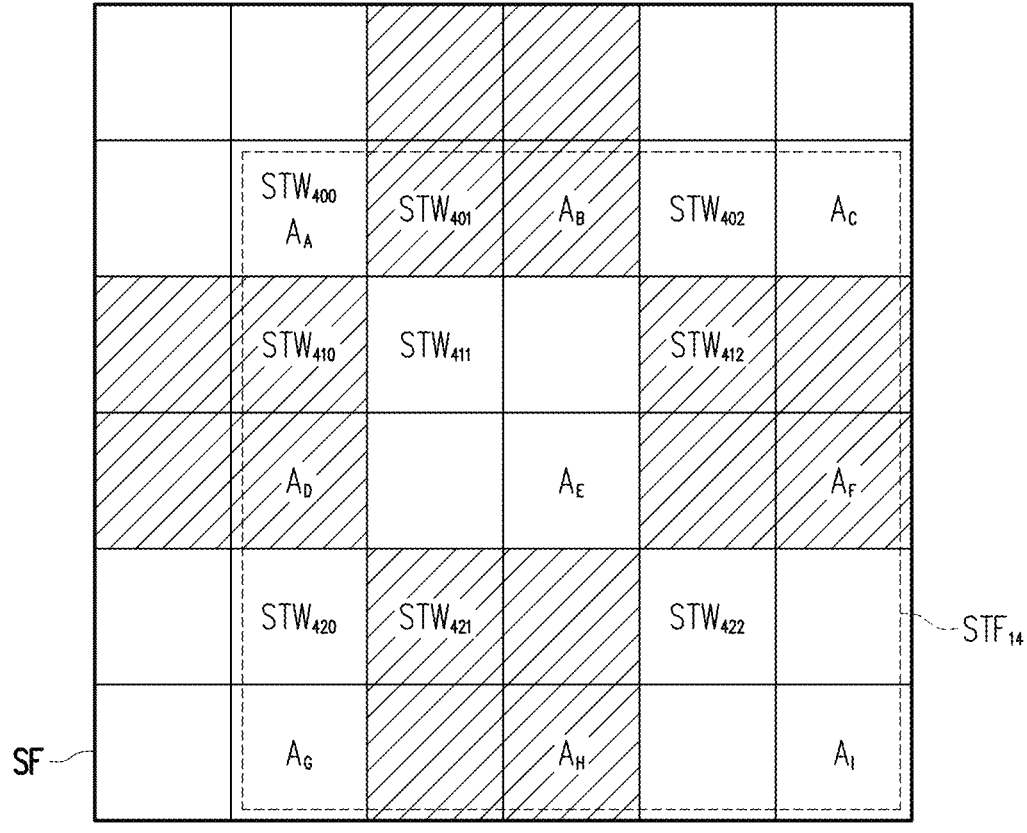

Referring to FIG. 8D, it is assumed that the size of the selected area $STF_{14}$ in FIG. 8D is 5×5, and the selected area $STF_{14}$ may be mapped to the shared filter SF with a size of 6×6 and then converted to obtain a sub-filter with a size of 3×3, for example, the same size as the sub-filter SEF in FIG. 5. For example, the selected area $STF_{14}$ in this embodiment covers and obtains 9 selected sub-weights $STW_{400}$ to $STW_{402}$, $STW_{410}$ to $STW_{412}$, and $STW_{420}$ to $STW_{422}$ corresponding to the sub-filter shown in FIG. 5. In other words, the selected area $STF_{14}$ has, for example, the selected sub-weights $STW_{400}$ to $STW_{402}$, $STW_{410}$ to $STW_{412}$, and $STW_{420}$ to $STW_{422}$ corresponding to the sub-weights $SEW_{00}$ to $SEW_{02}$, $SEW_{10}$ to $SEW_{12}$, and $SEW_{20}$ to $SEW_{22}$ of the sub-filter. If this sub-filter emphasizes the pixel in the lower right part of the bits (image), the selected sub-weight $STW_{422}$ located at the lower right corner of the selected area $STF_{14}$ is aligned toward the lower right corner of the shared filter SF, so that the selected area $STF_{14}$ occupies the areas $A_E$, $A_F$, $A_H$, and $A_I$ of the shared filter SF and part of the areas $A_A$, $A_B$, $A_C$, $A_D$, and $A_G$ of the shared filter SF. According to the relationship that one selected sub-weight of the selected area corresponds to one area of the shared filter SF, the selected sub-weights $STW_{400}$ to $STW_{422}$ correspond to the areas $A_A$ to $A_I$ respectively.

In an embodiment, multiple sub-filters respectively used for multiple channels may include, for example, a first sub-filter and a second sub-filter. The processor 12 may set one or more shared weights of the shared filter mapped to the selected area of the first sub-filter to be different from one or more shared weights of the shared filter mapped to the selected area of the second sub-filter. Taking FIG. 7, FIG. 8A, and FIG. 8B as an example, the shared weights of the shared filter SF mapped to the selected area $STF_{11}$ of the first sub-filter are $W_{A0}$ to $W_{A3}$, $W_{B0}$ to $W_{B3}$, $W_{C0}$, $W_{C2}$, $W_{D0}$ to $W_{D3}$, $W_{E0}$ to $W_{E3}$, $W_{F0}$, $W_{F2}$, $W_{G0}$, $W_{G1}$, $W_{H0}$, $W_{H1}$, and $W_{I0}$, and the shared weights of the shared filter SF mapped to the selected area $STF_{12}$ of the other sub-filter are $W_{A1}$, $W_{A3}$, $W_{B0}$ to $W_{B3}$, $W_{C0}$ to $W_{C3}$, $W_{D1}$, $W_{D3}$, $W_{E0}$ to $W_{E3}$, $W_{F0}$ to $W_{F3}$, $W_{G1}$, $W_{H0}$, $W_{H1}$, $W_{I0}$, and $W_{I1}$. Therefore, the shared weights $W_{A0}$, $W_{A2}$, $W_{D0}$, $W_{D2}$, and $W_{G0}$ mapped to the selected area $STF_{11}$ of the sub-filter are different from the shared weights $W_{A1}$, $W_{A3}$, $W_{B0}$ to $W_{B3}$, $W_{C0}$ to $W_{C3}$, $W_{D1}$, $W_{D3}$, $W_{E0}$ to $W_{E3}$, $W_{F0}$ to $W_{F3}$, $W_{G1}$, $W_{H0}$, $W_{H1}$, $W_{I0}$, and $W_{I1}$ mapped to the selected area $STF_{12}$ of the other sub-filter. In addition, the shared weights $W_{C1}$, $W_{C3}$, $W_{F1}$, $W_{F3}$, and $W_{I1}$ mapped to the selected area $STF_{12}$ of the sub-filter are also different from the shared weights $W_{A0}$ to $W_{A3}$, $W_{B0}$ to $W_{B3}$, $W_{C0}$, $W_{C2}$, $W_{D0}$ to $W_{D3}$, $W_{E0}$ to $W_{E3}$, $W_{F0}$, $W_{F2}$, $W_{G0}$, $W_{G1}$, $W_{H0}$, $W_{H1}$, and $W_{I0}$ mapped to the selected area $STF_{11}$ of the sub-filter.

Referring to FIG. 8A to FIG. 8D, since the selected areas $STF_{11}$ to $STF_{14}$ of these sub-filters respectively correspond or are mapped to different positions of the shared filter SF, some of the selected sub-weights $STW_{100}$ to $STW_{122}$, $STW_{200}$ to $STW_{222}$, $STW_{300}$ to $STW_{322}$, and $STW_{400}$ to $STW_{422}$ in the selected areas $STF_{11}$ to $STF_{14}$ of the sub-filters include part of the areas $A_A$ to $A_I$.

Referring to FIG. 6, the processor 12 may assign the shared weights according to the mapping result (step S630). Specifically, each selected sub-weight of the corresponding selected area of each sub-filter corresponds to one or more shared weights in the mapped area. As shown in FIG. 8A to FIG. 8D, the selected sub-weights $STW_{100}$ to $STW_{122}$, $STW_{200}$ to $STW_{222}$, $STW_{300}$ to $STW_{322}$, and $STW_{400}$ to $STW_{422}$ in the selected areas $STF_{11}$ to $STF_{14}$ of the sub-filters respectively correspond to the areas $A_A$ to $A_I$ of the shared filter SF. The processor 12 may determine the shared weights $W_{A0}$ to $W_{A3}$, $W_{B0}$ to $W_{B3}$, $W_{C0}$ to $W_{C3}$, $W_{D0}$ to $W_{D3}$, $W_{E0}$ to $W_{E3}$, $W_{F0}$ to $W_{F3}$, $W_{G0}$ to $W_{G3}$, $W_{H0}$ to $W_{H3}$, and $W_{I0}$ to $W_{I3}$ of the shared filter SF mapped to the selected sub-weights $STW_{100}$ to $STW_{122}$, $STW_{200}$ to $STW_{222}$, $STW_{300}$ to $STW_{322}$, and $STW_{400}$ to $STW_{422}$ of the corresponding selected areas of the respective sub-filters.

Figure 9B:
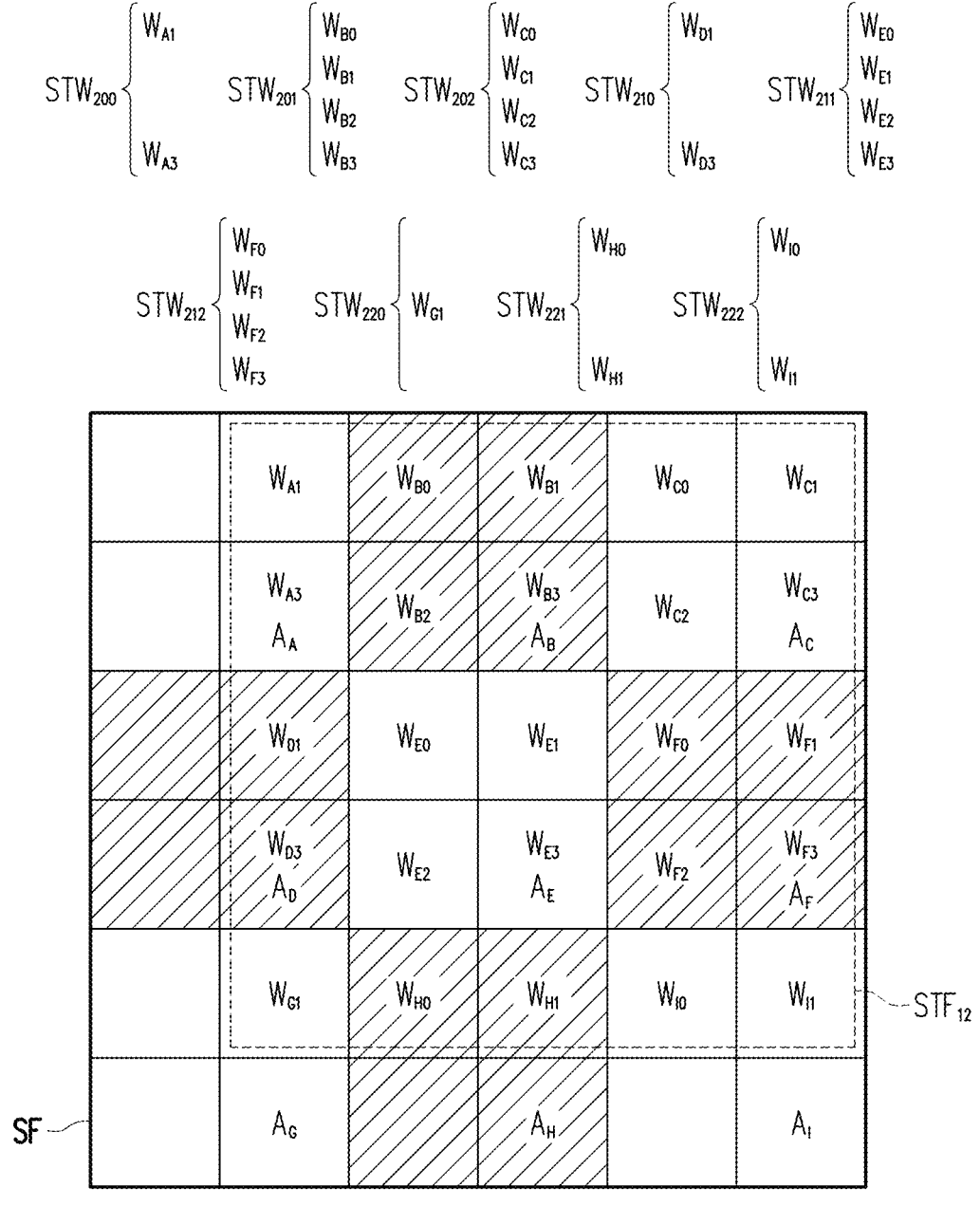

For example, FIG. 9A to FIG. 9D are schematic diagrams illustrating assignment of shared weights according to an embodiment of the disclosure. Referring to FIG. 8A and FIG. 9A, the selected sub-weight $STW_{100}$ of the selected area $STF_{11}$ of a sub-filter corresponds to all the shared weights $W_{A0}$ to $W_{A3}$ in the area $A_A$ of the shared filter SF. The selected sub-weight $STW_{101}$ of the selected area $STF_{11}$ of the sub-filter corresponds to all the shared weights $W_{B0}$ to $W_{B3}$ in the area $A_B$ of the shared filter SF. The selected sub-weight $STW_{102}$ of the selected area $STF_{11}$ of the sub-filter corresponds to two shared weights $W_{C0}$ and $W_{C2}$ in the area $A_C$ of the shared filter SF. The selected sub-weight $STW_{110}$ of the selected area $STF_{11}$ of the sub-filter corresponds to all the shared weights $W_{D0}$ to $W_{D3}$ in the area $A_D$ of the shared filter SF. The selected sub-weight $STW_{111}$ of the selected area $STF_{11}$ of the sub-filter corresponds to all the shared weights $W_{E0}$ to $W_{E3}$ in the area $A_E$ of the shared filter SF. The selected sub-weight $STW_{112}$ of the selected area $STF_{11}$ of the sub-filter corresponds to two shared weights $W_{F0}$ and $W_{F2}$ in the area $A_F$ of the shared filter SF. The selected sub-weight $STW_{120}$ of the selected area $STF_{11}$ of the sub-filter corresponds to two shared weights $W_{G0}$ and $W_{G1}$ in the area $A_G$ of the shared filter SF. The selected sub-weight $STW_{121}$ of the selected area $STF_{11}$ of the sub-filter corresponds to two shared weights $W_{H0}$ and $W_{H1}$ in the area $A_H$ of the shared filter SF. The selected sub-weight $STW_{122}$ of the selected area $STF_{11}$ of the sub-filter corresponds to one shared weight $W_{I0}$ in the area $A_I$ of the shared filter SF.

Accordingly, referring to FIG. 9B, the selected sub-weight $STW_{200}$ of the selected area $STF_{12}$ of another filter corresponds to the shared weights $W_{A1}$ and $W_{A3}$. The selected sub-weight $STW_{201}$ of the selected area $STF_{12}$ of the sub-filter corresponds to the shared weights $W_{B0}$ to $W_{B3}$. The selected sub-weight $STW_{202}$ of the selected area $STF_{12}$ of the sub-filter corresponds to the shared weights $W_{C0}$ to $W_{C3}$. The selected sub-weight $STW_{210}$ of the selected area $STF_{12}$ of the sub-filter corresponds to the shared weights $W_{D1}$ and $W_{D3}$. The selected sub-weight $STW_{211}$ of the selected area $STF_{12}$ of the sub-filter corresponds to the shared weights $W_{E0}$ to $W_{E3}$. The selected sub-weight $STW_{212}$ of the selected area $STF_{12}$ of the sub-filter corresponds to the shared weights $W_{F0}$ to $W_{F3}$. The selected sub-weight $STW_{220}$ of the selected area $STF_{12}$ of the sub-filter corresponds to the shared weight $W_{G1}$. The selected sub-weight $STW_{221}$ of the selected area $STF_{12}$ of the sub-filter corresponds to the shared weights $W_{H0}$ and $W_{H1}$. The selected sub-weight $STW_{222}$ of the selected area $STF_{12}$ of the sub-filter corresponds to the shared weights $W_{I0}$ and $W_{I1}$.

Figure 9C:
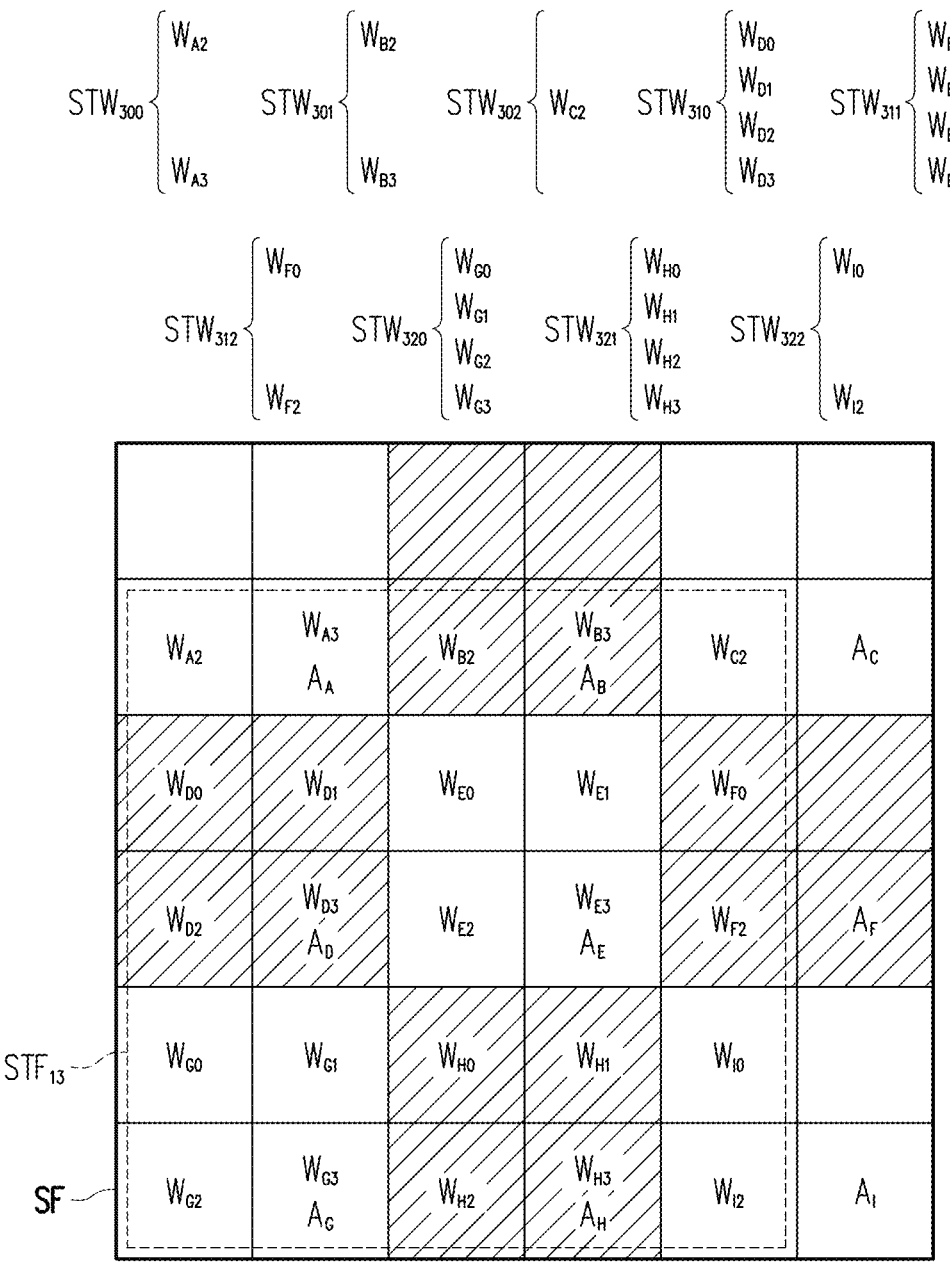

Referring to FIG. 9C, the selected sub-weight $STW_{300}$ of the selected area $STF_{13}$ of yet another sub-filter corresponds to the shared weights $W_{A2}$ and $W_{A3}$. The selected sub-weight $STW_{301}$ of the selected area $STF_{13}$ of the sub-filter corresponds to the shared weights $W_{B2}$ and $W_{B3}$. The selected sub-weight $STW_{302}$ of the selected area $STF_{13}$ of the sub-filter corresponds to the shared weight $W_{C2}$. The selected sub-weight $STW_{310}$ of the selected area $STF_{13}$ of the sub-filter corresponds to the shared weights $W_{D0}$ to $W_{D3}$. The selected sub-weight $STW_{311}$ of the selected area $STF_{13}$ of the sub-filter corresponds to the shared weights $W_{E0}$ to $W_{E3}$. The selected sub-weight $STW_{312}$ of the selected area $STF_{13}$ of the sub-filter corresponds to the shared weights $W_{F0}$ and $W_{F2}$. The selected sub-weight $STW_{320}$ of the selected area $STF_{13}$ of the sub-filter corresponds to the shared weights $W_{G0}$ to $W_{G3}$. The selected sub-weight $STW_{321}$ of the selected area $STF_{13}$ of the sub-filter corresponds to the shared weights $W_{H0}$ to $W_{H3}$. The selected sub-weight $STW_{322}$ of the selected area $STF_{13}$ of the sub-filter corresponds to the shared weights $W_{I0}$ and $W_{I2}$.

Figure 9D:
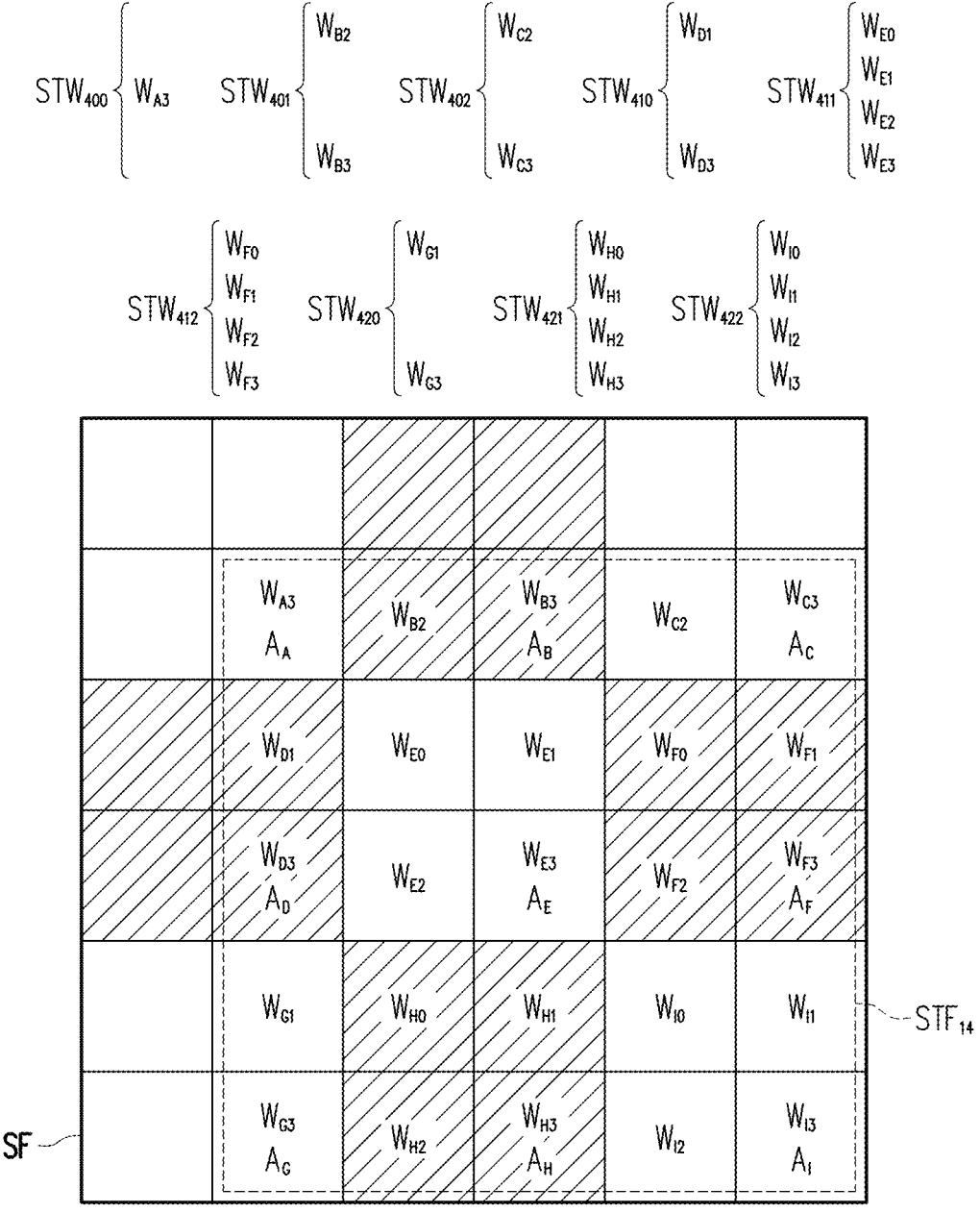

Referring to FIG. 9D, the selected sub-weight $STW_{400}$ of the selected area $STF_{14}$ of yet another sub-filter corresponds to the shared weight $W_{A3}$. The selected sub-weight $STW_{401}$ of the selected area $STF_{14}$ of the sub-filter corresponds to the shared weights $W_{B2}$ and $W_{B3}$. The selected sub-weight $STW_{402}$ of the selected area $STF_{14}$ of the sub-filter corresponds to the shared weights $W_{C2}$ and $W_{C3}$. The selected sub-weight $STW_{410}$ of the selected area $STF_{14}$ of the sub-filter corresponds to the shared weights $W_{D1}$ and $W_{D3}$. The selected sub-weight $STW_{411}$ of the selected area $STF_{14}$ of the sub-filter corresponds to the shared weights $W_{E0}$ to $W_{E3}$. The selected sub-weight $STW_{412}$ of the selected area $STF_{14}$ of the sub-filter corresponds to the shared weights $W_{F0}$ to $W_{F3}$. The selected sub-weight $STW_{420}$ of the selected area $STF_{14}$ of the sub-filter corresponds to the shared weights $W_{G1}$ and $W_{G3}$. The selected sub-weight $STW_{421}$ of the selected area $STF_{14}$ of the sub-filter corresponds to the shared weights $W_{H0}$ to $W_{H3}$. The selected sub-weight $STW_{422}$ of the selected area $STF_{14}$ of the sub-filter corresponds to the shared weights $W_{I0}$ to $W_{I3}$.

It is worth noting that the size of the selected area of the sub-filter is not limited to 5×5 (height×width) as shown in FIG. 9A to FIG. 9D.

Figure 10A:
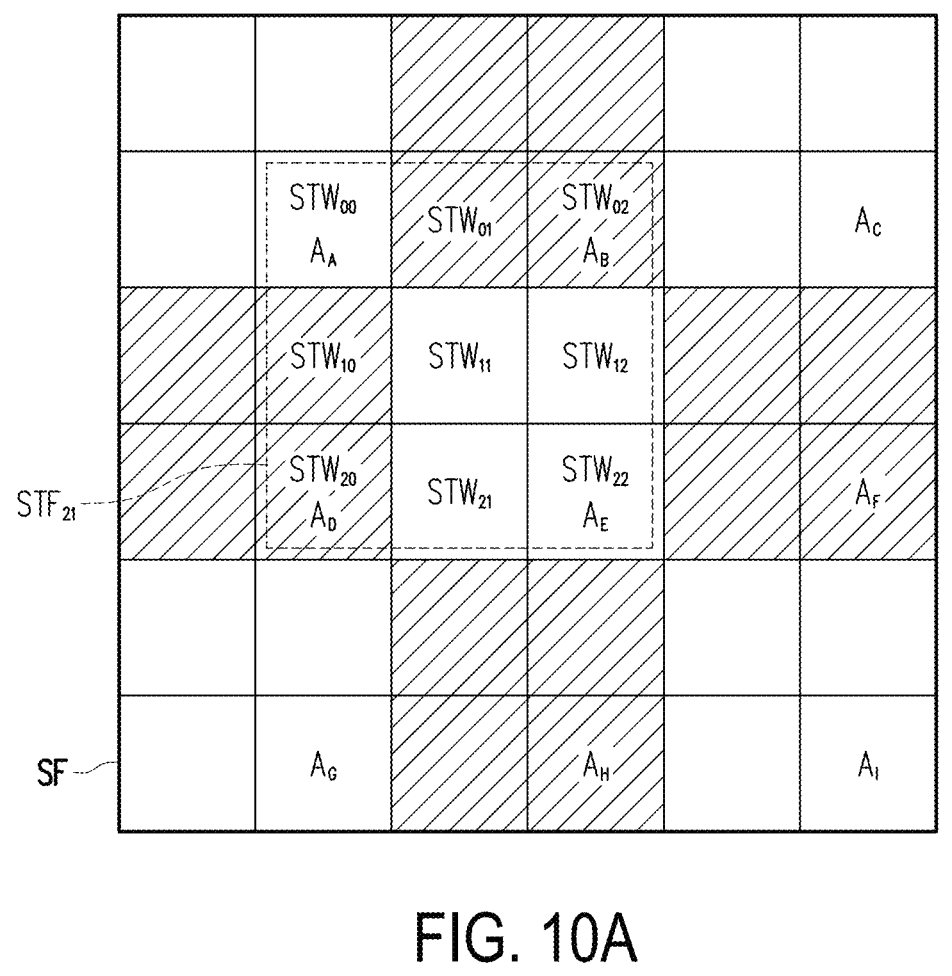
Figure 10B:
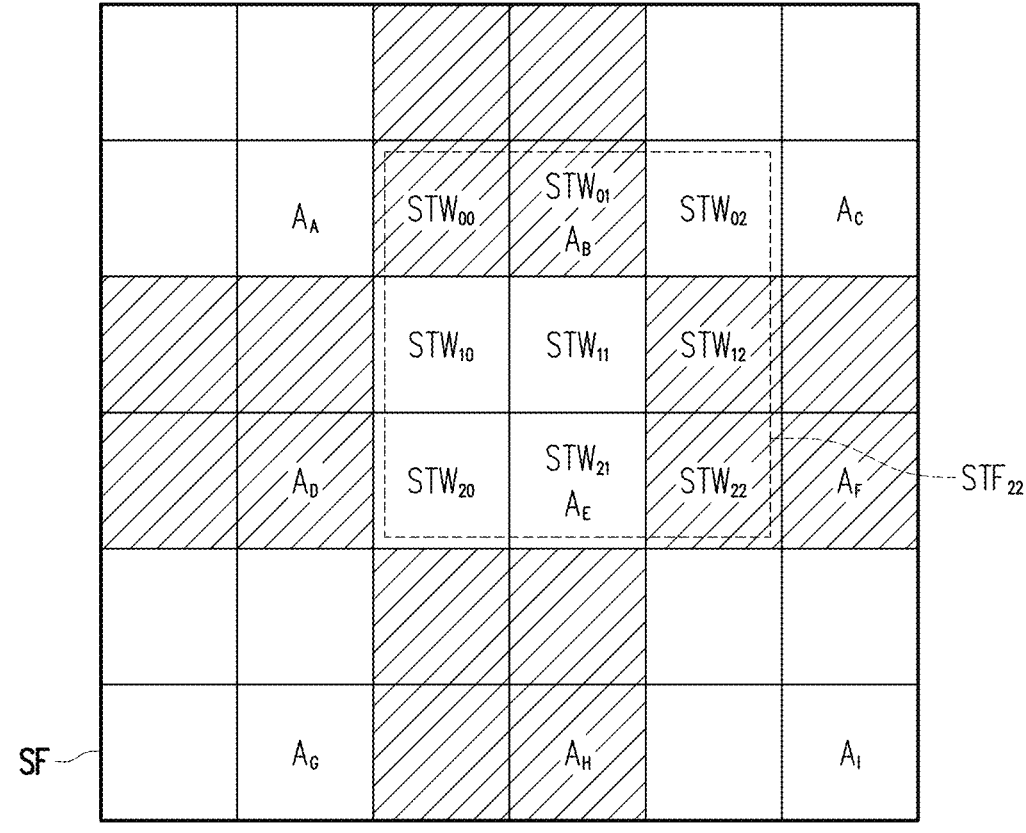

For example, FIG. 10A to FIG. 10D are schematic diagrams illustrating assignment of shared weights according to another embodiment of the disclosure. Compared to the assignment of shared weights shown in FIG. 9A to FIG. 9D, the shared weights in FIG. 10A to FIG. 10D are assigned using a selected area with a size of 3×3. In the assignment of shared weights of FIG. 10A to FIG. 10D according to this embodiment, the areas of the shared filter SF mapped to the selected areas $STF_{21}$, $STF_{22}$, $STF_{23}$, and $STF_{24}$ of the sub-filters all include the shared weights $W_{E0}$ to $W_{E3}$ of the area $A_E$ (as shown in FIG. 7). Referring to FIG. 10A, the selected area $STF_{21}$ of a sub-filter in this embodiment only corresponds to the areas $A_A$, $A_B$, $A_D$, and $A_E$. The area $A_A$ corresponds to the selected sub-weight $STW_{00}$. The area $A_B$ corresponds to the selected sub-weights $STW_{01}$ and $STW_{02}$. The area $A_D$ corresponds to the selected sub-weights $STW_{10}$ and $STW_{20}$. The area $A_E$ corresponds to the selected sub-weights $STW_{11}$, $STW_{12}$, $STW_{21}$, and $STW_{22}$.

Referring to FIG. 10B, the selected area $STF_{22}$ of another sub-filter in this embodiment only corresponds to the areas $A_B$, $A_C$, $A_E$, and $A_F$. The area $A_B$ corresponds to the selected sub-weights $STW_{00}$ and $STW_{01}$. The area $A_C$ corresponds to the selected sub-weight $STW_{02}$. The area $A_E$ corresponds to the selected sub-weights $STW_{10}$, $STW_{11}$, $STW_{20}$, and $STW_{21}$. The area $A_F$ corresponds to the selected sub-weights $STW_{12}$ and $STW_{22}$.

Figure 10C:
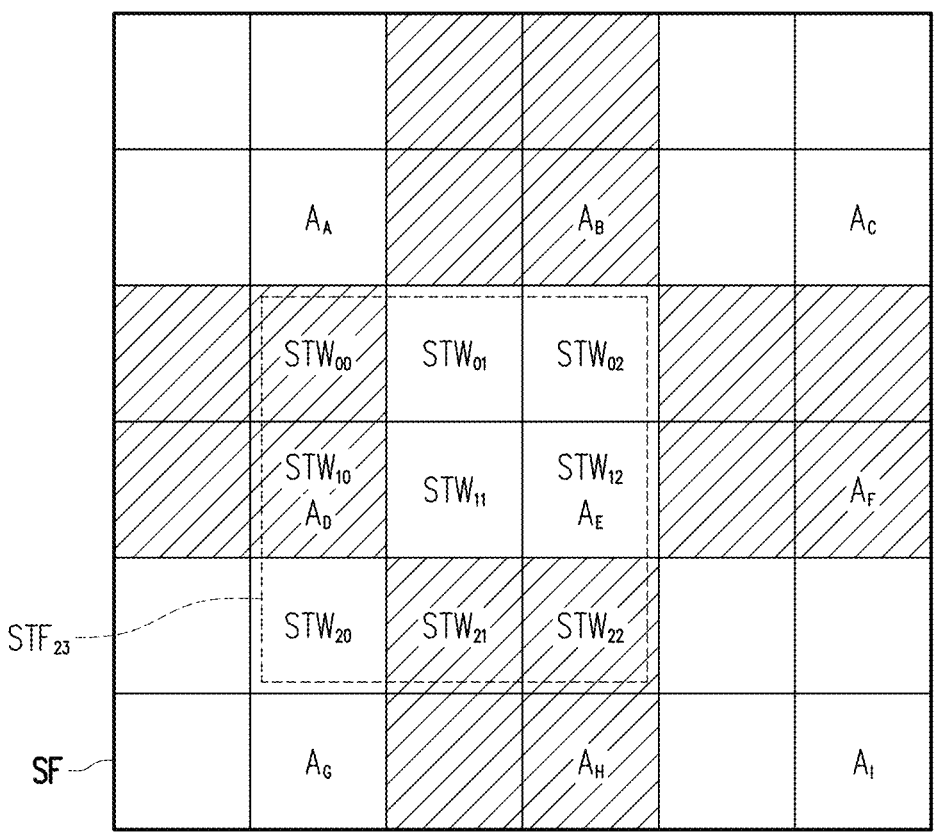

Referring to FIG. 10C, the selected area $STF_{23}$ of yet another sub-filter in this embodiment only corresponds to the areas $A_D$, $A_E$, $A_G$, and $A_H$. The area $A_D$ corresponds to the selected sub-weights $STW_{00}$ and $STW_{10}$. The area $A_E$ corresponds to the selected sub-weights $STW_{01}$, $STW_{02}$, $STW_{11}$, and $STW_{12}$. The area $A_G$ corresponds to the selected sub-weight $STW_{20}$. The area $A_H$ corresponds to the selected sub-weights $STW_{21}$ and $STW_{22}$.

Figure 10D:
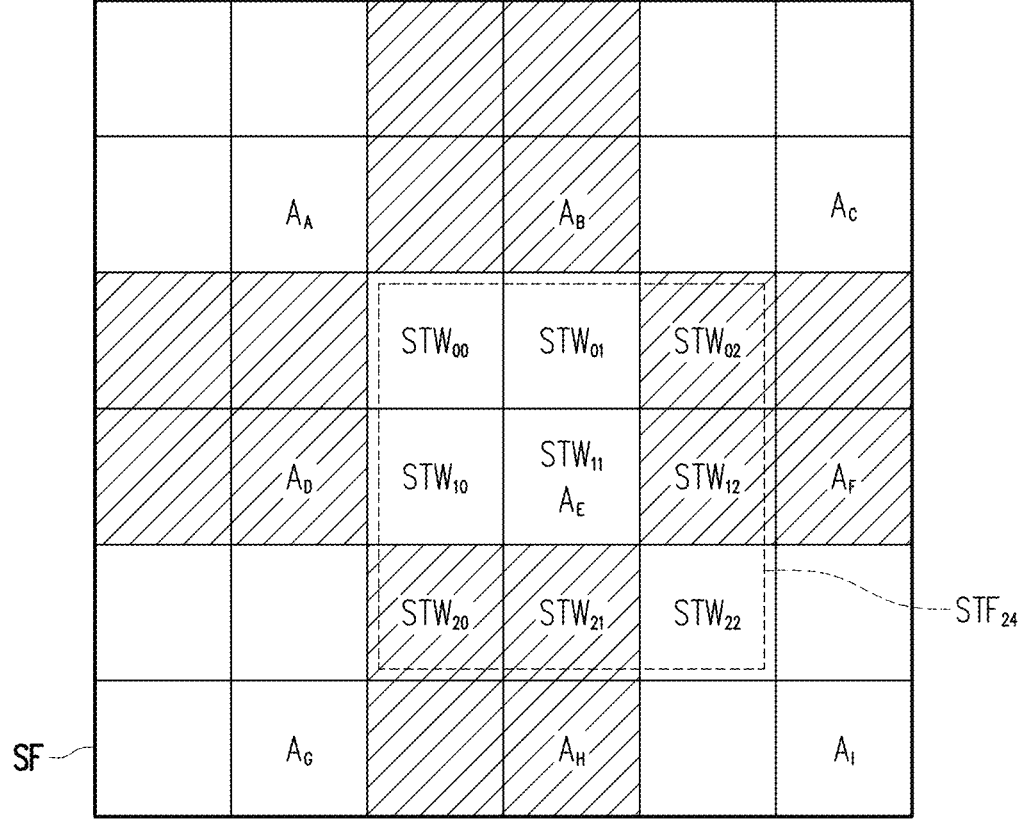

Referring to FIG. 10D, the selected area $STF_{24}$ of yet another sub-filter in this embodiment only corresponds to the areas $A_E$, $A_F$, $A_H$, and $A_I$. The area $A_E$ corresponds to the selected sub-weights $STW_{00}$, $STW_{01}$, $STW_{10}$, and $STW_{11}$. The area $A_F$ corresponds to the selected sub-weights $STW_{02}$ and $STW_{12}$. The area $A_H$ corresponds to the selected sub-weights $STW_{20}$ and $STW_{21}$. The area $A_I$ corresponds to the selected sub-weight $STW_{22}$.

Figure 11A:
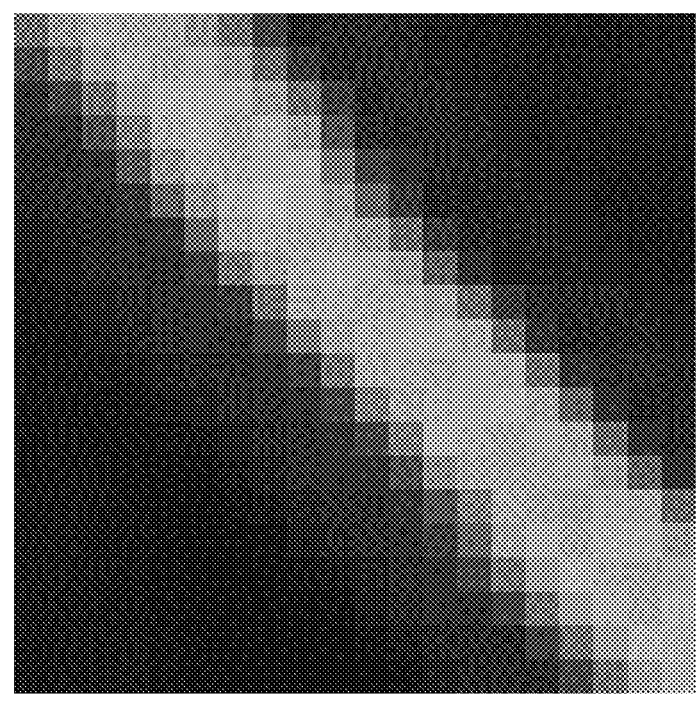
FIG. 11A is a view illustrating halo caused by using the shared filter of FIG. 9A to FIG. 9D according to an embodiment of the disclosure.
Figure 11B:
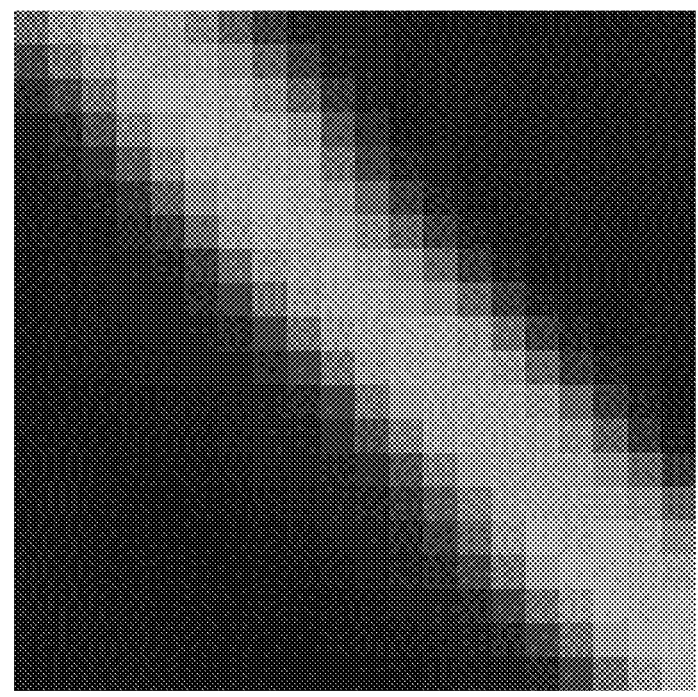
FIG. 11B is a view illustrating use of the shared filter of FIG. 10A to FIG. 10D without causing halo according to an embodiment of the disclosure.

FIG. 11A is a view illustrating halo caused by using the selected area of the sub-filter of FIG. 9A to FIG. 9D according to an embodiment of the disclosure, and FIG. 11B is a view illustrating the use of the selected area of the sub-filter of FIG. 10A to FIG. 10D without causing halo according to an embodiment of the disclosure. Referring to FIG. 11A, larger selected areas (for example, the selected areas $STF_{11}$ to $STF_{14}$ in FIG. 9A to FIG. 9D) may reduce performance degradation, but may cause halo. Referring to FIG. 11B, although smaller selected areas (for example, the selected areas $STF_{21}$ to $STF_{24}$ in FIG. 10A to FIG. 10D) may have larger performance degradation, there is no halo. Nevertheless, the size of the selected area of the sub-filter may still be adjusted as required, and is not limited to the above embodiment of the disclosure.

Referring to FIG. 3, the processor 12 generates the sub-weights of each sub-filter according to the assigned shared weights (step S330). In an embodiment, for each sub-filter, the processor 12 may obtain the sub-weights by adding up the corresponding shared weights in an area of the shared filter SF mapped to each selected sub-weight in each selected area. As described above, one selected sub-weight in the selected area of each sub-filter may be mapped to one or more shared weights in an area of the shared filter. If one selected sub-weight in the selected area of each sub-filter is mapped to multiple shared weights in an area of the shared filter, the processor 12 may add up the shared weights in the area. Details will be described below.

Taking FIG. 9A as an example, the selected sub-weight $STW_{100}$ of the selected area $STF_{11}$ of the sub-filter corresponds to the shared weights $W_{A0}$ to $W_{A3}$ in the area $A_A$ of the shared filter SF. The value of the selected sub-weight $STW_{100}$ is the sum of the shared weights $W_{A0}$ to $W_{A3}$. In addition, the weights $W_{A0}$ to $W_{A3}$ have the same value. Therefore, the value of the selected sub-weight $STW_{100}$ is four times the value of any one of the weights $W_{A0}$ to $W_{A3}$. Accordingly, the value of the selected sub-weight $STW_{101}$ is the sum of the shared weights $W_{B0}$ to $W_{B3}$ (that is, four times the value of any one of the weights $W_{B0}$ to $W_{B3}$), the value of the selected sub-weight $STW_{102}$ is the sum of the shared weights $W_{C0}$ and $W_{C2}$ (that is, twice the value of any one of the weights $W_{C0}$ and $W_{C2}$), the value of the selected sub-weight $STW_{110}$ is the sum of the shared weights $W_{D0}$ to $W_{D3}$ (that is, four times the value of any one of the weights $W_{D0}$ to $W_{D3}$), the value of the selected sub-weight $STW_{111}$ is the sum of the shared weights $W_{E0}$ to $W_{E3}$ (that is, four times the value of any one of the weights $W_{E0}$ to $W_{E3}$), the value of the selected sub-weight $STW_{112}$ is the sum of the shared weights $W_{F0}$ and $W_{F2}$ (that is, twice the value of any one of the weights $W_{F0}$ and $W_{F2}$), the value of the selected sub-weight $STW_{120}$ is the sum of the shared weights $W_{G0}$ and $W_{G1}$ (that is, twice the value of any one of the weights $W_{G0}$ and $W_{G1}$), the value of the selected sub-weight $STW_{121}$ is the sum of the shared weights $W_{H0}$ and $W_{H1}$ (that is, twice the value of any one of the weights $W_{H0}$ and $W_{H1}$), and the value of the selected sub-weight $STW_{122}$ is the value of the shared weight $W_{J0}$.

Taking FIG. 9B as an example, the value of the selected sub-weight $STW_{200}$ is the sum of the shared weights $W_{A1}$ and $W_{A3}$ (that is, twice the value of any one of the weights $W_{A1}$ and $W_{A3}$), the value of the selected sub-weight $STW_{201}$ is the sum of the shared weights $W_{B0}$ to $W_{B3}$ (that is, four times the value of any one of the weights $W_{B0}$ to $W_{B3}$), the value of the selected sub-weight $STW_{202}$ is the sum of the shared weights $W_{C0}$ to $W_{C3}$ (that is, four times the value of any one of the weights $W_{C0}$ to $W_{C3}$), the value of the selected sub-weight $STW_{210}$ is the sum of the shared weights $W_{D1}$ and $W_{D3}$ (that is, twice the value of any one of the weights $W_{D1}$ and $W_{D3}$), the value of the selected sub-weight $STW_{211}$ is the sum of the shared weights $W_{E0}$ to $W_{E3}$ (that is, four times the value of any one of the weights $W_{E0}$ to $W_{E3}$), the value of the selected sub-weight $STW_{212}$ is the sum of the shared weights $W_{F0}$ to $W_{F3}$ (that is, four times the value of any one of the weights $W_{F0}$ to $W_{F3}$), the value of the selected sub-weight $STW_{220}$ is the value of the shared weight $W_{G1}$, the value of the selected sub-weight $STW_{221}$ is the sum of the shared weights $W_{H0}$ and $W_{H1}$ (that is, twice the value of any one of the weights $W_{H0}$ and $W_{H1}$), and the value of the selected sub-weight $STW_{222}$ is the sum of the shared weights $W_{J0}$ and $W_{J1}$ (that is, twice the value of any one of the weights $W_{J0}$ and $W_{J1}$). The values of the selected sub-weights $STW_{300}$ to $STW_{322}$ of the sub-filter $STF_{13}$ and the selected sub-weights $STW_{400}$ to $STW_{422}$ of the sub-filter $STF_{14}$ in FIG. 9C and FIG. 9D may be obtained in a similar manner, and thus will not be repeated here.

In an embodiment, the size of a sub-filter is $k_H * k_W$ (height×width), and the conversion rate is $r_H * r_W$ (height× width). Then, the size of the shared filter may be defined as $(k_H × r_H * k_W × r_W)$ (height×width). In this embodiment, the size of the selected area may be defined as $((k_H-1)r_H+1)*((r_W-1)r_W+1)$ (height×width), for example. The shared weight for the input data of the $i^{th}$ channel in the selected area (located in the $h+1^{th}$ column and $w+1^{th}$ row) may be defined as $w_{i,h,w}$. h is an integer from 0 to $(k_H-1)r_H$, and w is an integer from 0 to $(r_W-1)r_W$. The sub-weight for the input data of the $i^{th}$ channel and the output data of the $o^{th}$ channel in the sub-filter (located in the $y+1^{th}$ column and $x+1^{th}$ row) may be defined as $z_{j,y,x,o}$. x is an integer from 0 to $k_W-1$, y is an integer from 0 to $h_H-1$, and is an integer from 0 to $r_H * r_W-1$. The processor 12 may define the sub-weight $z_{j,y,x,o}$ as:

$$z_{i,y,x,o} = \sum_{h=\alpha \ldots \beta} \sum_{w=\gamma \ldots \delta} w_{i,h,w}, \tag{1}$$

where $\alpha$ is $\min(0, \ yr_H - \lfloor o/r_W \rfloor)$, $\beta$ is $\min((k_H-1)r_H, \ (y+1) r_H-1-\lfloor o/r_W \rfloor)$, $\gamma$ is $\min(0, \ xr_W-(o \ \% \ r_W)$, and $\delta$ is $\min(k_W-1)r_W, \ (x+1)r_W-1-(o \ \% \ r_W)$. min( ) is to take the minimum value, $\lfloor \ \rfloor$ is to take the round down, and % is to take the remainder.

Figure 12:
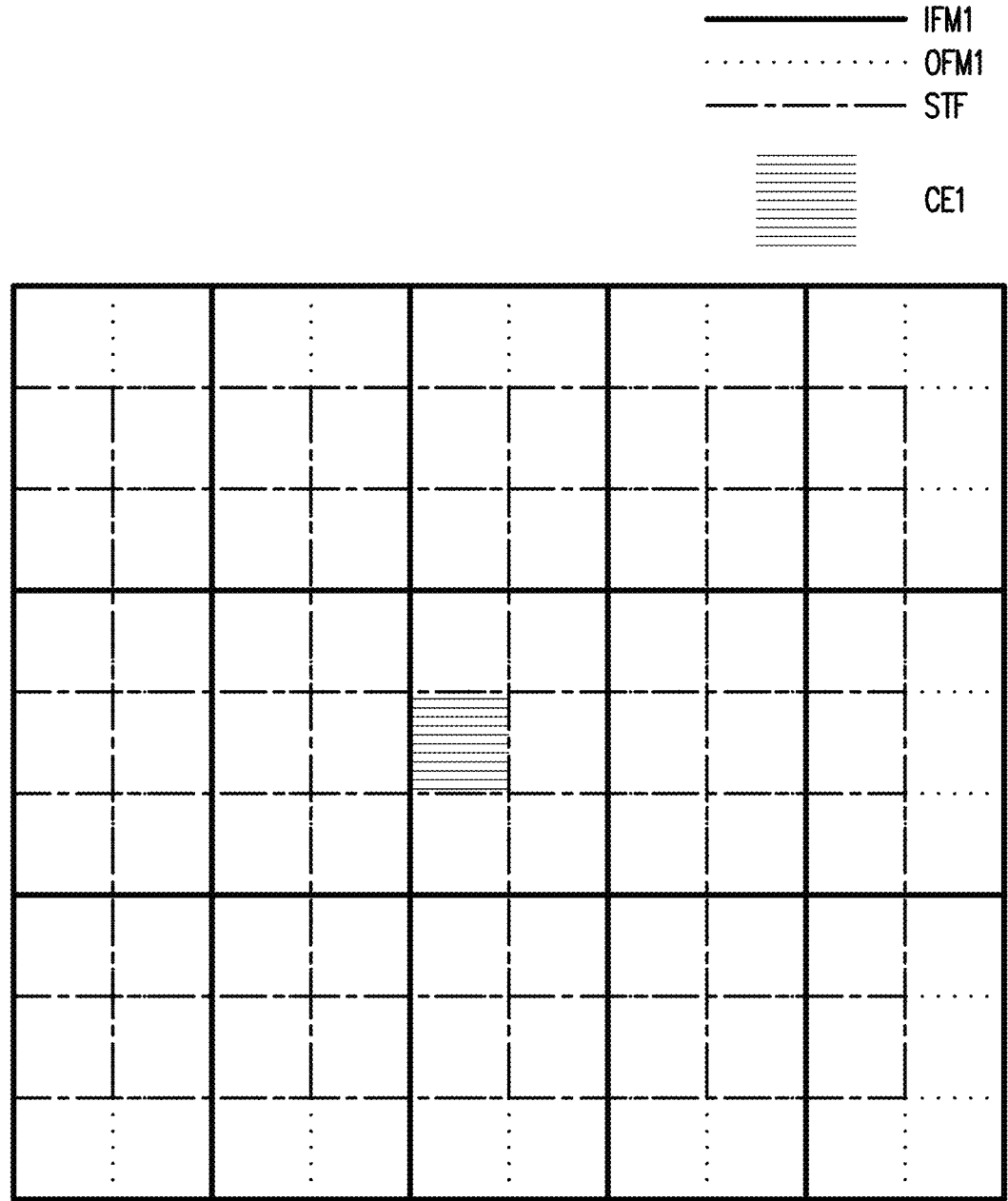
FIG. 12 is a schematic diagram illustrating the relationship between input data, output data, and a shared filter according to an embodiment of the disclosure.

For example, FIG. 12 is a schematic diagram illustrating the relationship between input data IFM1, output data OFM1, and the selected area STF according to an embodiment of the disclosure. Referring to FIG. 12, the input data IFM1 may have, for example, a low-resolution size of 3×5 (height×width). In order to generate the output data OFM1 of 9×10 (height×width) from the input data IFM1, the input data IFM1 may be computed with a sub-filter of 3×5 (height×width) to generate the output data OFM1 of 9×10 (height×width). The weight of the sub-filter may be obtained by adding up the shared weights corresponding to the shared weight (the 1×1 square framed by the long-short dashed line) of the 7×9 (height×width) selected area STF. The sub-filter corresponding to the $i^{th}$ channel is shown below as an example:

$$z_{i,0,0,2} = \sum_{h=0 \ldots 1} \sum_{w=0 \ldots 1} w_{i,h,w} \tag{2}$$

$$z_{i,0,1,2} = \sum_{h=0 \ldots 1} \sum_{w=2 \ldots 3} w_{i,h,w} \tag{3}$$

$$z_{i,0,2,2} = \sum_{h=0 \ldots 1} \sum_{w=4 \ldots 5} w_{i,h,w} \tag{4}$$

$$z_{i,0,3,2} = \sum_{h=0 \ldots 1} \sum_{w=6 \ldots 7} w_{i,h,w} \tag{5}$$

$$z_{i,0,4,2} = \sum_{h=0 \ldots 1} \sum_{w=8} w_{i,h,w} \tag{6}$$

$$z_{i,1,0,2} = \sum_{h=2 \ldots 4} \sum_{w=0 \ldots 1} w_{i,h,w} \tag{7}$$

$$z_{i,2,0,2} = \sum_{h=5 \ldots 6} \sum_{w=0 \ldots 1} w_{i,h,w} \tag{8}$$

and so on for the rest, which will not be repeated here. Furthermore, the central shared weight CE1 of the shared filter SF may be aligned with the sub-weight of the sub-filter.

In an exemplary embodiment, the size of the sub-filter may be the same as the size of the input data, $k_H * k_W$ (height×width). In an exemplary embodiment, input data of lower resolution may be used to generate output data of higher resolution with the parameter optimizing method of a neural network and the computing apparatus according to this embodiment. The sizes of the input data and the sub-filter may be, for example, $k_H * k_W$ (height×width), the conversion rate may be, for example, $r_H * r_W$ (height×width), and the size of the output data may be, for example, $(k_H × r_H * k_W × r_W)$ (height×width). In addition, in an exemplary embodiment, the size of the shared filter may be the same as the size of the output data $(k_H × r_H * k_W × r_W)$ (height× width). Furthermore, the size of the selected area may be defined as $((k_H-1)r_H+1)*((r_W-1)r_W+1)$ (height×width), for example. The size (or dimensions) of each sub-filter may be smaller than the size of the shared filter. For example, the sizes of the input data and the sub-filter may be 3×3 (height×width), and the sizes of the shared filter and the output data may be 6×6 (height×width), but not limited thereto. Alternatively, the sizes of the input data and the sub-filter may be 3×5 (height×width), and the sizes of the shared filter and the output data may be 9×10 (height× width). The input data may be computed with the sub-filter to generate the output data. In an exemplary embodiment, the number of channels is, for example, $r_H * r_W$.

Referring to FIG. 3, the processor 12 uses the sub-filters of multiple channels to compute with one or more pieces of data respectively (step S340). The computation may be a convolution operation, subpixeling, unpacking, pooling, addition, or other neural network-related operations.

In an embodiment, the computation is a first convolution operation. The input data includes multiple pieces of first input data corresponding to multiple channels. The processor 12 may perform the first convolution operation on one sub-filter and one first input data according to the corresponding channel respectively, so as to generate multiple pieces of first output data corresponding to the channels. Further, the processor 12 may perform a first format conversion on the first output data to generate second output data of a single channel. The first format conversion is used to assign the first output data of multiple channels to the second output data of a single channel, so that the second output data includes all pixels of the first output data of all channels. The first format conversion is, for example, a subpixeling operation, a transposed convolution operation, or an unpacking operation.

In an embodiment, the number of channels is N. In the first format conversion, the processor 12 may assign the first elements at the same position in multiple pieces of first output data to N adjacent elements in the second output data. For example, when the number of channels is four, the four adjacent elements in the second output data are respectively the first elements located in the first column and the first row of the first output data corresponding to the four channels. Thereby, an image with a higher resolution may be generated.

In an embodiment, the processor 12 may perform a second format conversion on input data IFM21 (for example, the first image) to generate first output data corresponding to multiple channels. The second format conversion is, for example, a packing operation. That is to say, the first image of a single channel is converted into the first input data of multiple channels. Thereby, for example, the resolution may be reduced.

Figure 13A:
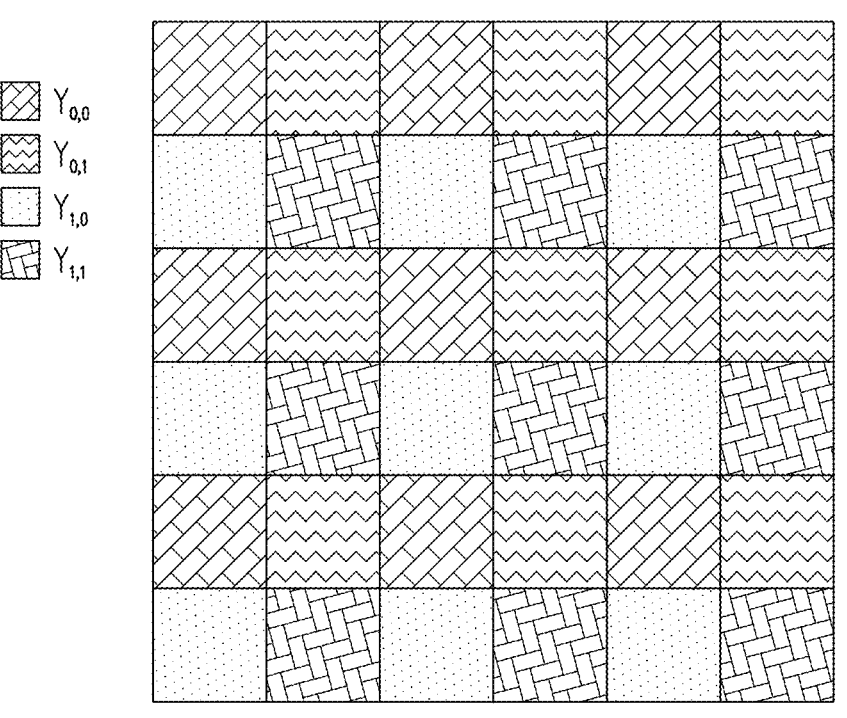
FIG. 13A is a schematic diagram of first input data according to an embodiment of the disclosure.

For example, FIG. 13A is a schematic diagram of the input data IFM21 according to an embodiment of the disclosure. Referring to FIG. 13A, the size of the input data IFM21 is 6×6 (height×width). The input data IFM21 includes pixels $Y_{0,0}$, $Y_{0,1}$, $Y_{1,0}$, and $Y_{1,1}$.

Figure 13B:
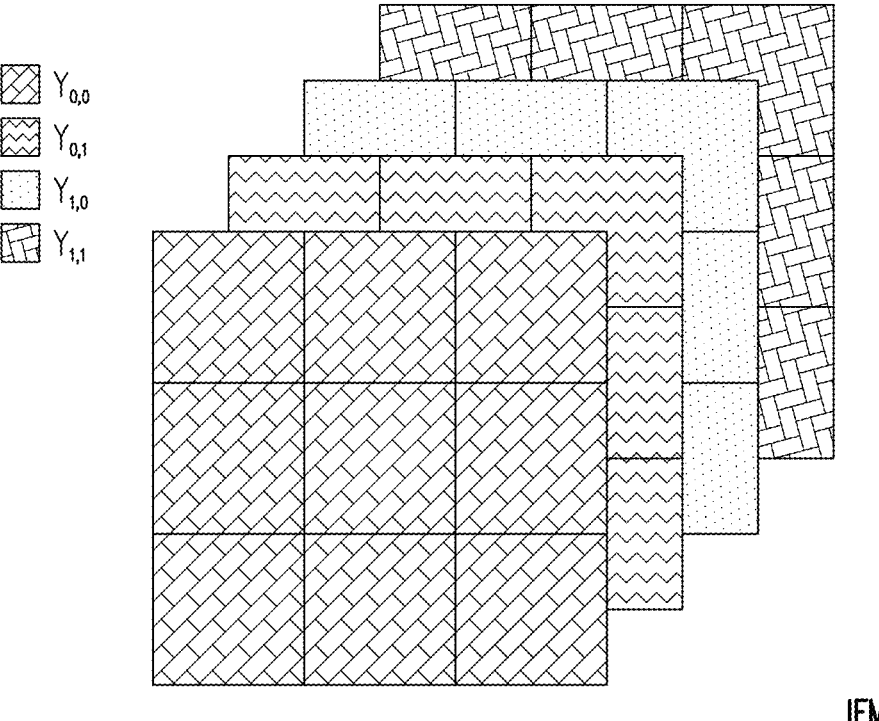
FIG. 13B is a schematic diagram of packed first input data according to an embodiment of the disclosure.

FIG. 13B is a schematic diagram of packed first input data IFM22 according to an embodiment of the disclosure. Referring to FIG. 13A and FIG. 13B, the pixels $Y_{0,0}$, $Y_{0,1}$, $Y_{1,0}$, and $Y_{1,1}$ of the input data IFM21 of a single channel are respectively assigned to the first input data IFM22 of four channels. Each of the first input data IFM22 includes only one of the pixels $Y_{0,0}$, $Y_{0,1}$, $Y_{1,0}$, and $Y_{1,1}$.

Figure 13C:
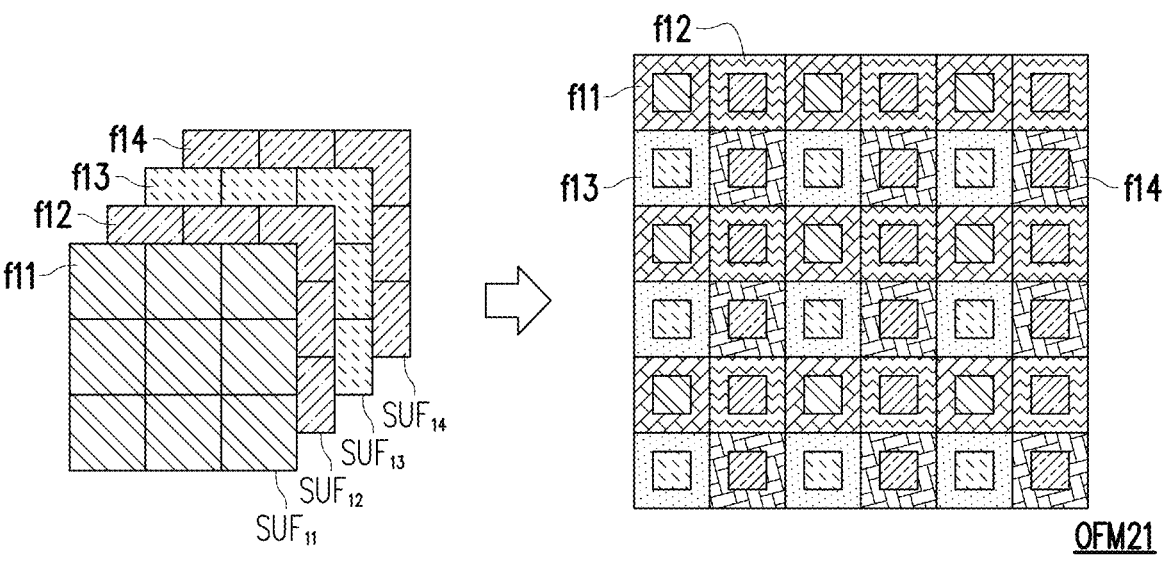
FIG. 13C is a schematic diagram illustrating a convolution operation and unpacking for filters that do not use shared weights according to an embodiment of the disclosure.

FIG. 13C is a schematic diagram illustrating a convolution operation and unpacking for filters $SUF_{11}$, $SUF_{12}$, $SUF_{13}$, and $SUF_{14}$ that do not use shared weights according to an embodiment of the disclosure. Referring to FIG. 13B and FIG. 13C, the filters $SUF_{11}$, $SUF_{12}$, $SUF_{13}$, and $SUF_{14}$ that do not use shared weights have their own weights. These filters $SUF_{11}$, $SUF_{12}$, $SUF_{13}$, and $SUF_{14}$ respectively undergo a first convolution operation with the first input data IFM22, and are unpacked into the second output data OFM21 as a result of the first convolution operation. Therefore, the characteristics of the weights f11, f12, f13, and f14 of the filters $SUF_{11}$, $SUF_{12}$, $SUF_{13}$, and $SUF_{14}$ of four channels simultaneously appear in the second output data OFM21.

Figure 13D:
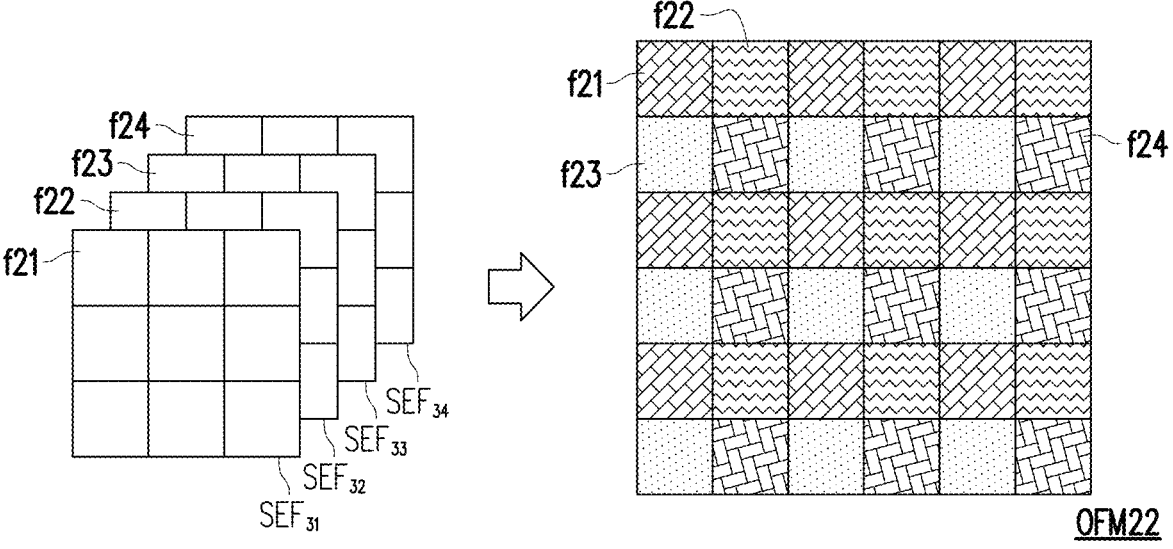
FIG. 13D is a schematic diagram illustrating a convolution operation and unpacking for sub-filters that use shared weights according to an embodiment of the disclosure.

FIG. 13D is a schematic diagram illustrating a convolution operation and unpacking for sub-filters $SEF_{31}$, $SEF_{32}$, $SEF_{33}$, and $SEF_{34}$ that use shared weights according to an embodiment of the disclosure. Referring to FIG. 13B and FIG. 13D, the weights f21, f22, f23, and f24 are all based on the shared weights of the shared filter to retain the same characteristics. For example, the weights f21, f22, f23, and f24 have the same weight value. For example, the processor may use $SEF_{31}$, $SEF_{32}$, $SEF_{33}$, and $SEF_{34}$ to compute with the first input data IFM22 respectively. By sharing the shared weights, checkerboard artifacts may be avoided on the second output data OFM22 after up-sampling (for example, convolution operation and subpixeling).

In an embodiment, the computation is a first convolution operation. The input data includes second input data of a single channel. The processor 12 may perform the first convolution operation on multiple sub-filters and the second input data respectively to generate multiple pieces of third output data of multiple channels correspondingly. In addition, the processor 12 may perform a first format conversion on the third output data to generate fourth output data of a single channel. The first format conversion is as described above, and thus will not be repeated here.

Figure 14A:
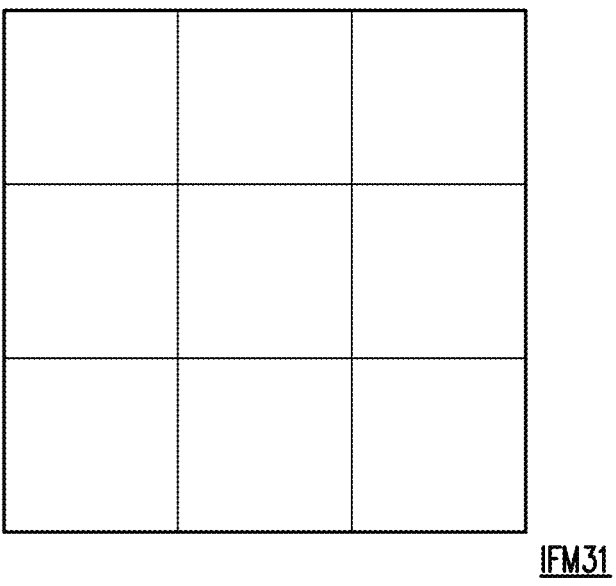
FIG. 14A is a schematic diagram of first input data according to another embodiment of the disclosure.

For example, FIG. 14A is a schematic diagram of second input data IFM31 according to another embodiment of the disclosure. Referring to FIG. 14A, the size of the second input data IFM31 is 3×3 (height×width).

Figure 14B:
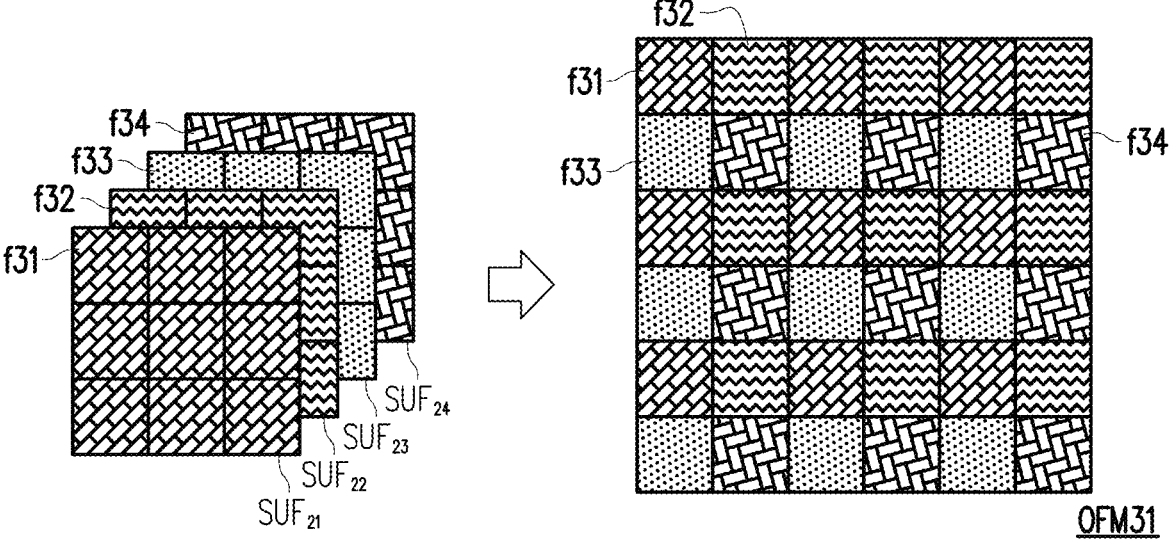
FIG. 14B is a schematic diagram illustrating a convolution operation and subpixeling for filters that do not use shared weights according to an embodiment of the disclosure.

FIG. 14B is a schematic diagram illustrating a convolution operation and subpixeling for filters $SUF_{21}$, $SUF_{22}$, $SUF_{23}$, and $SUF_{24}$ that do not use shared weights according to an embodiment of the disclosure. Referring to FIG. 14B, the filters $SUF_{21}$, $SUF_{22}$, $SUF_{23}$, and $SUF_{24}$ that do not use shared weights have their own weights f31, f32, f33, and f34 respectively, and the second input data IFM31 undergoes a first convolution operation and subpixeling with the filters $SUF_{21}$, $SUF_{22}$, $SUF_{23}$, and $SUF_{24}$ respectively, thereby generating the output data OFM31.

Figure 14C:
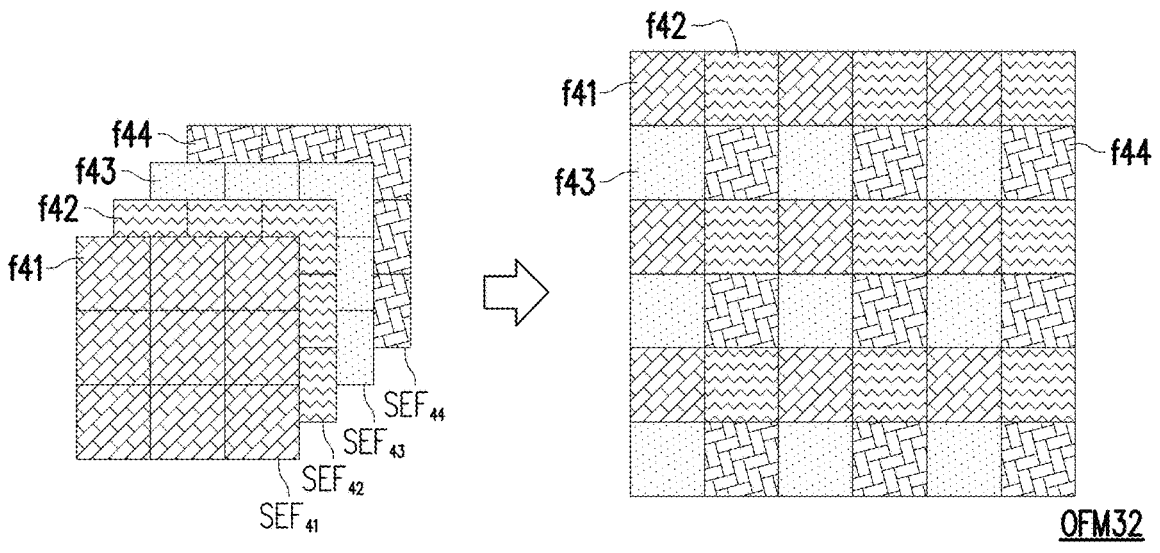
FIG. 14C is a schematic diagram illustrating a convolution operation and subpixeling for sub-filters that use shared weights according to an embodiment of the disclosure.

FIG. 14C is a schematic diagram illustrating a convolution operation and subpixeling for sub-filters $SEF_{41}$, $SEF_{42}$, $SEF_{43}$, and $SEF_{44}$ that use shared weights according to an embodiment of the disclosure. Referring to FIG. 14C, the weights f41, f42, f43, and f44 are all based on the shared weights of the shared filter to retain the same characteristics. For example, the processor may use the sub-filters $SEF_{41}$, $SEF_{42}$, $SEF_{43}$, and $SEF_{44}$ of multiple channels to compute with the second input data IFM31 respectively. By sharing the shared weights, checkerboard artifacts may be avoided on the fourth output data OFM32 after subpixeling.

The above-described method of the embodiment of the disclosure may be applied to a network with a subpixel convolution operation (or called pixel shuffle) such as ESPCN (Efficient Sub-Pixel Convolutional Neural Network) or SRGAN (Super-Resolution Generative Adversarial Network) for super-resolution. The above-described method of the embodiment of the disclosure may be applied to a network with a transposed convolution operation (or called a fractionally-strided convolution operation), such as DCGAN (Deep Convolutional Generative Adversarial Network) for image generation or U-net for image enhancement.

Figure 15:
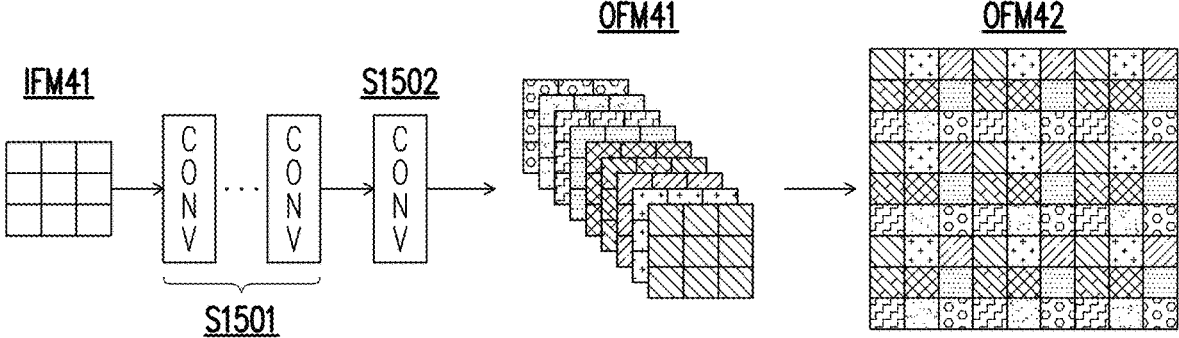
FIG. 15 is a schematic diagram illustrating application to a network without shortcuts according to an embodiment of the disclosure.

FIG. 15 is a schematic diagram illustrating application to a network without shortcuts according to an embodiment of the disclosure. The shortcut may also be called a skip connection or a residual connection. Referring to FIG. 15, the processor 12 may perform one or more second convolution operations on the input data IFM41 of a single channel (for example, a low-resolution third image) to generate multiple pieces of first input data corresponding to multiple channels (step S1501). The second convolution operation may be a traditional convolution operation. For example, a traditional convolution operation with filter that uses or does not use shared weights. The processor 12 may perform a first convolution operation on multiple pieces of first input data of multiple channels (step S1502) to generate multiple pieces of first output data OFM41 corresponding to those channels. That is, the first convolution operation is performed on multiple sub-filters and the corresponding first input data OFM41 according to the corresponding channels. Then, the processor 12 may perform a first format conversion, such as a subpixeling operation, on the first output data OFM41 to assign the values of the first output data OFM41 of those channels to the second output data OFM42 of a single channel.

Specifically, after the sub-filters of the channels are respectively computed with an input feature map (input data) with a first resolution, an output feature map (output data) may be generated. The output feature map has, for example, a second resolution, and the second resolution is higher than the first resolution. In addition, in an exemplary embodiment, the size of the shared filter is, for example, the same as the size of the output feature map (output data).

Figure 16A:
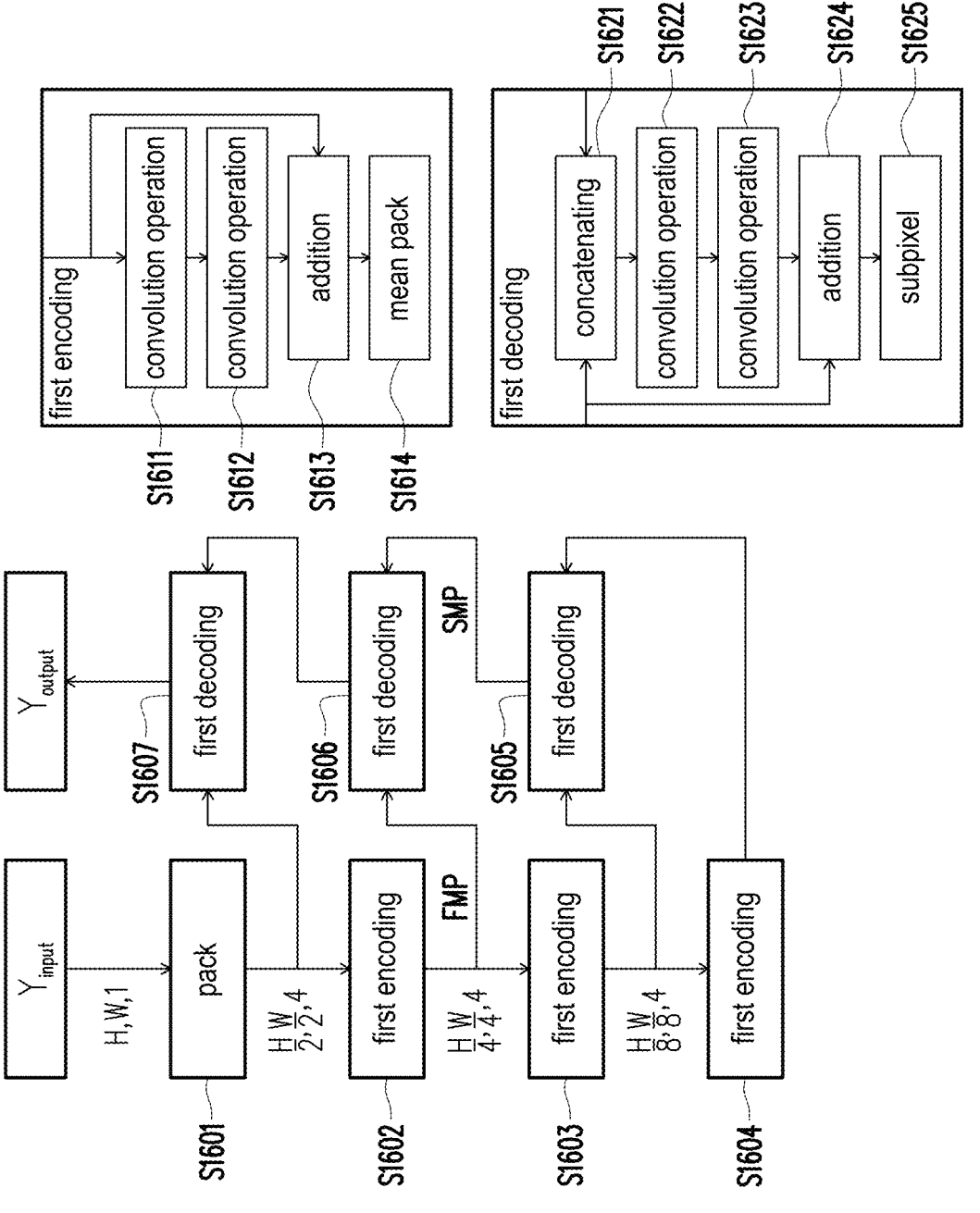
FIG. 16A is a schematic diagram illustrating application to a network with shortcuts according to an embodiment of the disclosure.

FIG. 16A is a schematic diagram illustrating application to a network with shortcuts according to an embodiment of the disclosure. Referring to FIG. 16A, taking U-net as an example, the processor 12 may pack an input image $Y_{input}$ (the configured height×width×channel is W×H×1) into third input data of multiple channels (the configured height× width×channel is W/2×H/2×4) (step S1601). The third input data (for example, second image) sequentially undergoes a first encoding (steps S1602 to S1604) to generate first input data corresponding to multiple channels, thereby reducing the image size.

In an embodiment, the first encoding includes a second format conversion for conversion from a single channel to multiple channels. For example, in a certain first encoding (steps S1602 to S1604), the processor 12 may sequentially perform a convolution operation (step S1611), a convolution operation (step S1612), addition (for example, element-wise add) (step S1613), and mean packing (step S1614) on the input third input data.

Figure 16B:
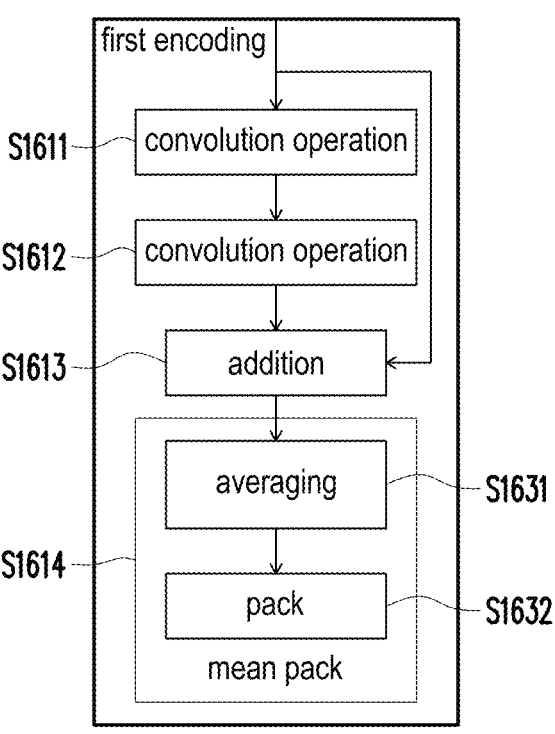
FIG. 16B is a functional schematic diagram of a first encoding according to an embodiment of the disclosure.

FIG. 16B is a functional schematic diagram of a first encoding according to an embodiment of the disclosure. Referring to FIG. 16B, in the first encoding of this embodiment, mean packing (step S1614) includes an averaging operation (step S1631) and packing (that is, second format conversion) (step S1632). In the averaging operation (step S1631), the data (the data is, for example, pixel data) at each same corresponding position in the input data of multiple different channels is averaged. For example, this embodiment may obtain an average value of the pixels located in the first column and the first row in the data of each channel. Further, packing (step S1632) is to convert (or assign) the above-mentioned averaged multiple pieces of pixel data to multiple channels respectively, and the number of channels output after mean packing is, for example, the same as the number of channels input to mean packing. Based on the mean packing (step S1614) of this embodiment, an averaging operation is performed on each same corresponding position in the data of multiple different channels. Therefore, the mean-packed data in this embodiment establishes the correlation between the data of different channels. In other words, shortcuts that eliminate checkerboard artifacts may be generated through the mean packing of this embodiment.

Figure 16C:
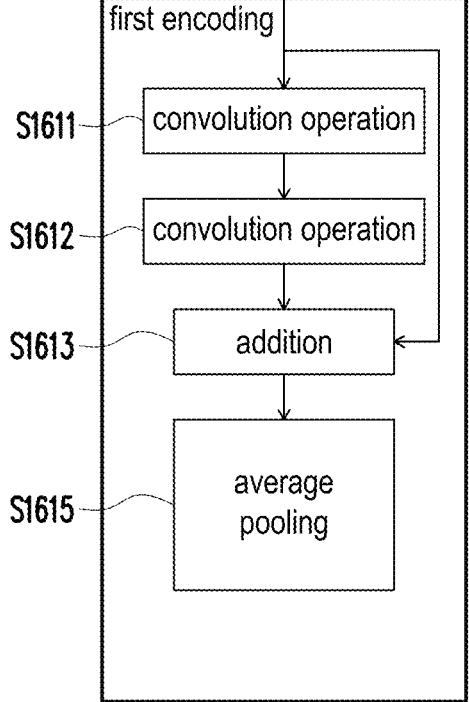
FIG. 16C is a functional schematic diagram of a first encoding according to another embodiment of the disclosure.

In another embodiment, the first encoding includes an average pooling. For example, FIG. 16C is a functional schematic diagram of a first encoding according to another embodiment of the disclosure. Referring to FIG. 16C, in a certain first encoding (steps S1602 to S1604), the processor 12 may sequentially perform a convolution operation (step S1611), a convolution operation (step S1612), an addition (step S1613), and an average pooling (step S1615) on the input third input data. The average pooling is to perform an averaging operation through a filter.

Figure 16D:
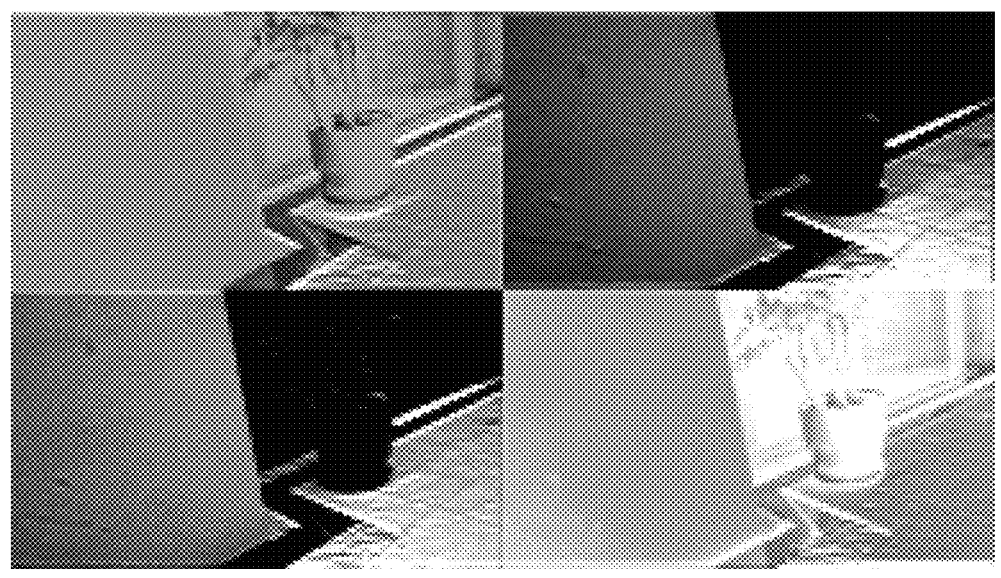
FIG. 16D is a schematic diagram illustrating low-resolution data according to an embodiment of the disclosure.
Figure 16E:
FIG. 16E is a schematic diagram illustrating packing of the data in FIG. 16D into high-resolution data according to an embodiment of the disclosure.

FIG. 16D is a schematic diagram illustrating low-resolution data according to an embodiment of the disclosure, and FIG. 16E is a schematic diagram illustrating packing of the data in FIG. 16D into high-resolution data according to an embodiment of the disclosure. Referring to FIG. 16D and FIG. 16E, through average packing, four pieces of low-resolution data may be packed into one high-resolution data.

Referring to FIG. 16A, in an embodiment, the processor 12 may perform a first decoding on first data FMP of multiple channels that undergoes the first encoding and second input data SMP that undergoes the first decoding. For example, the first decoding is performed on the first data FMP of multiple channels output in step S1602 and the second data SMP of a single channel output in step S1605 (step S1606). The processor 12 may also perform a first decoding on the first data of multiple channels that undergoes the first encoding and the first data of multiple channels that undergoes another first encoding. For example, the first decoding is performed on the first data of multiple channels output in step S1603 and the first data of multiple channels output in step S1604 (step S1605).

In another embodiment, the processor 12 may perform a first decoding on first data of multiple channels that undergoes a second format conversion (for example, packing operation) and second input data that undergoes first decoding. For example, the first decoding may be performed on the first data of multiple channels output in step S1601 and the second data of a single channel output in step S1606 (step S1607). Finally, an output image $Y_{output}$ (the configured height×width×channel is W×H×1) may be generated.

In an embodiment, the first decoding includes the above-mentioned first convolution operation (for example, performing a convolution operation with a sub-filter based on shared weights) and subpixeling (for example, assigning data of multiple channels to data of a single channel). For example, in a certain first decoding (steps S1605 to S1607), the processor 12 may sequentially perform concatenation (step S1621), a second convolution operation (step S1622), a first convolution operation (step S1623), addition (step S1624), and subpixeling (step S1625) on the input first or second input data.

Figure 17A:
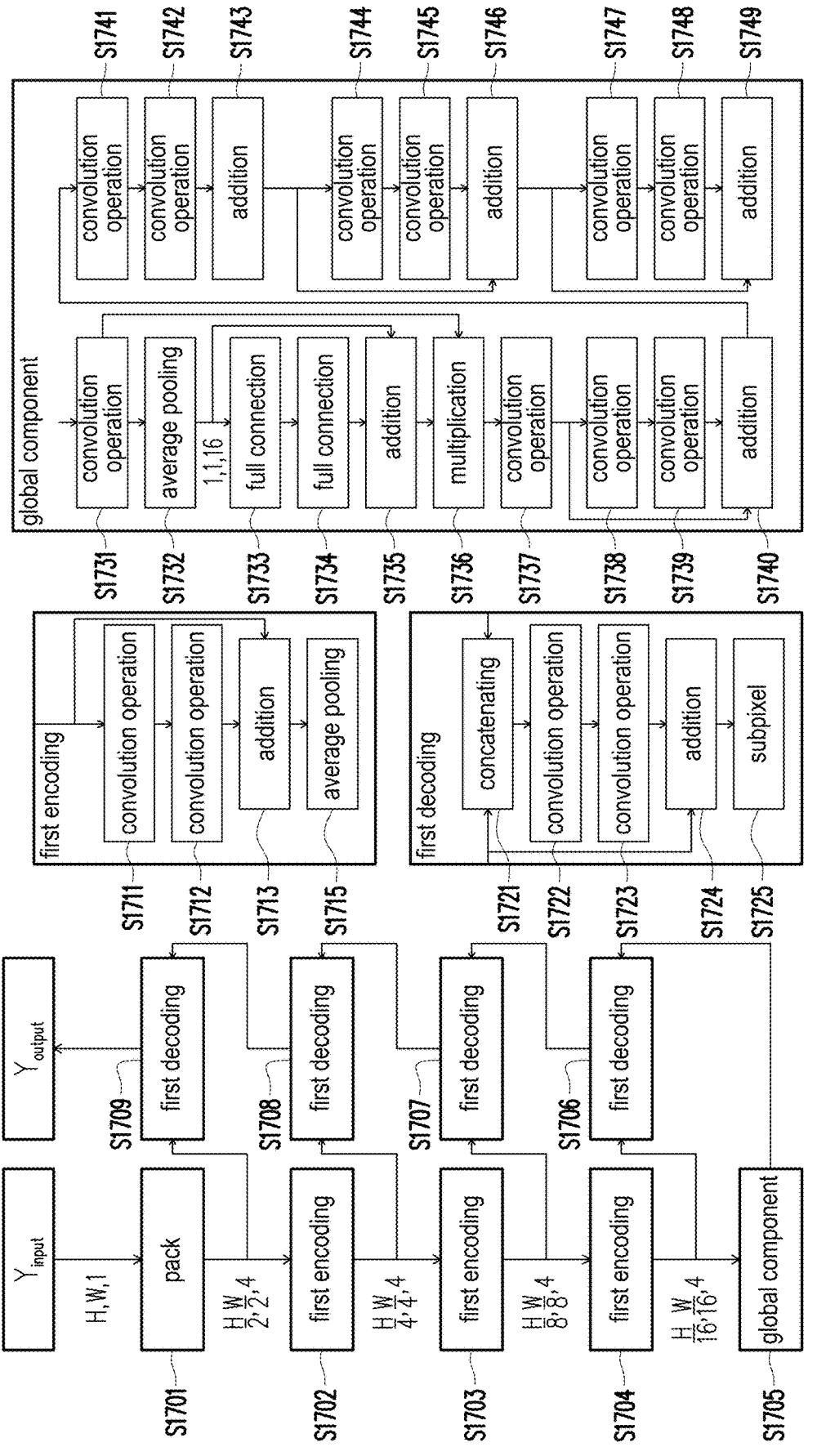
FIG. 17A is a schematic diagram illustrating a network with packing and scaling according to an embodiment of the disclosure.

FIG. 17A is a schematic diagram illustrating a network with packing and scaling according to an embodiment of the disclosure. Referring to FIG. 16A, FIG. 16C, and FIG. 17A, details of steps S1701 to S1704 and S1707 to S1709 may be found in the description of steps S1601 to S1603 and S1606 to S1607, details of steps S1711 to S1715 may be found in the description of steps S1611 to S1615, and details of steps S1721 to S1722 and S1724 to S1725 may be found in the description of steps S1621 to S1622 and S1624 to S1625, which will not be repeated here. The difference between FIG. 17A and FIG. 16A is that, in step S1705 of FIG. 17A, the processor 12 performs global component processing on multiple pieces of first input data of multiple channels output in step S1704 (step S1705).

Following the above, in the global component processing, the processor 12 may sequentially perform a convolution operation (step S1731), an average pooling (step S1732), a full connection (steps S1733 and S1734), an addition (step S1735), a multiplication (for example, element-wise multiply) (step S1736), a convolution operation (steps S1737 to S1739), an addition (step S1740), a convolution operation (steps S1741 to S1742), an addition (step S1743), a convolution operation (steps S1744 to S1745), an addition (step S1746), a convolution operation (steps S1747 to S1748), and an addition (step S1748).

The processor 12 performs a convolution operation on the data output in step S1722 (step S1723). In this embodiment, step S1723 is, for example, the above-mentioned second convolution operation. In addition, the processor 12 performs a first decoding on the first data of multiple channels output in step S1704 and the second data of a single channel output in step S1705 (step S1706).

Figure 17B:
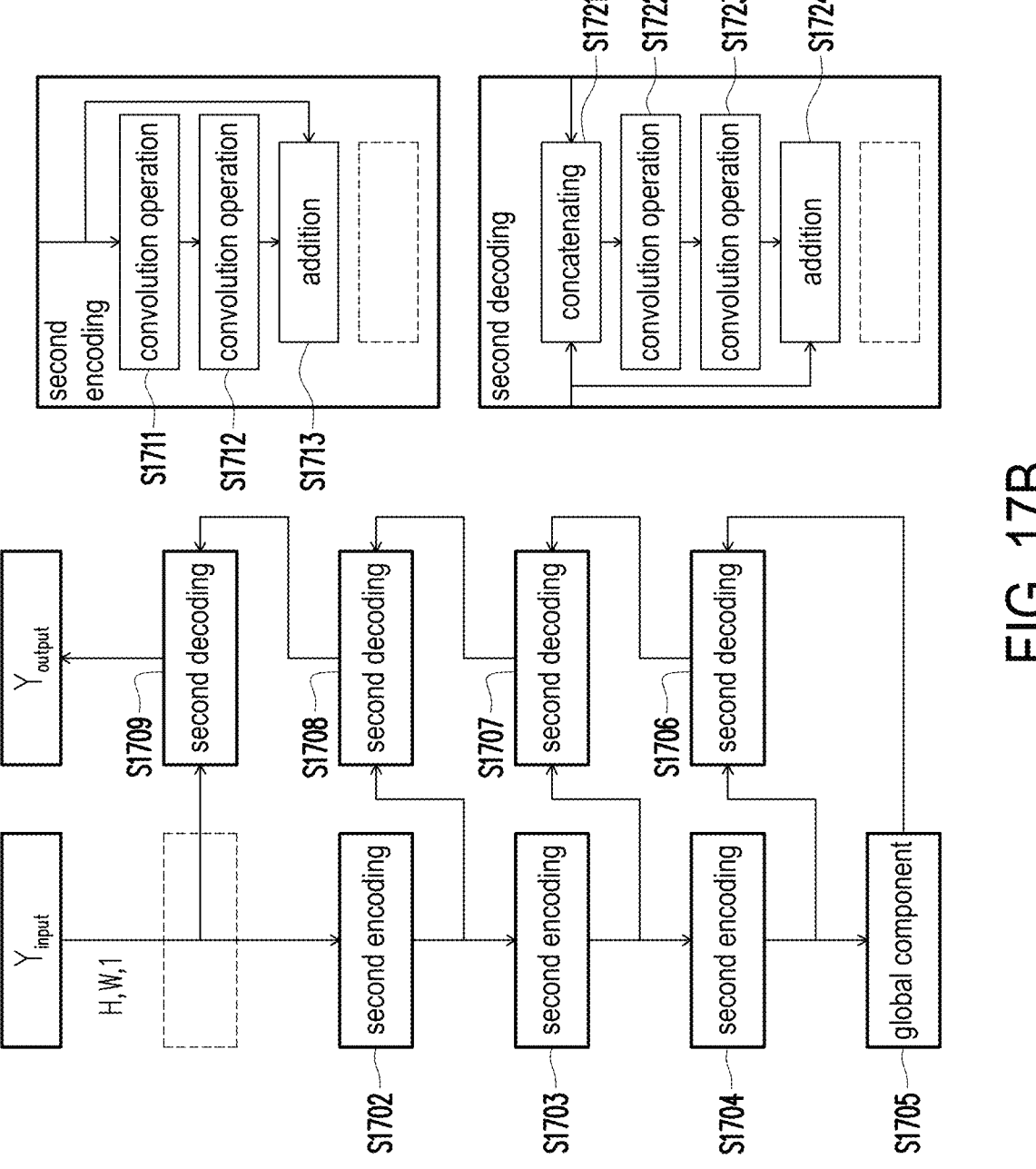
FIG. 17B is a schematic diagram illustrating a network without packing and scaling according to an embodiment of the disclosure.

FIG. 17B is a schematic diagram illustrating a network without packing and scaling according to an embodiment of the disclosure. Referring to FIG. 17A and FIG. 17B, the difference between the implementation of FIG. 17B and the implementation of FIG. 17A is that the network of FIG. 17B does not perform a packing step. In addition, corresponding to the first encoding in the implementation of FIG. 17A, the second encoding of this embodiment does not perform the average pooling of the first encoding. Further, corresponding to the first decoding in the implementation of FIG. 17A, the second decoding of this embodiment does not perform the subpixeling of the first decoding.

Figure 17C:
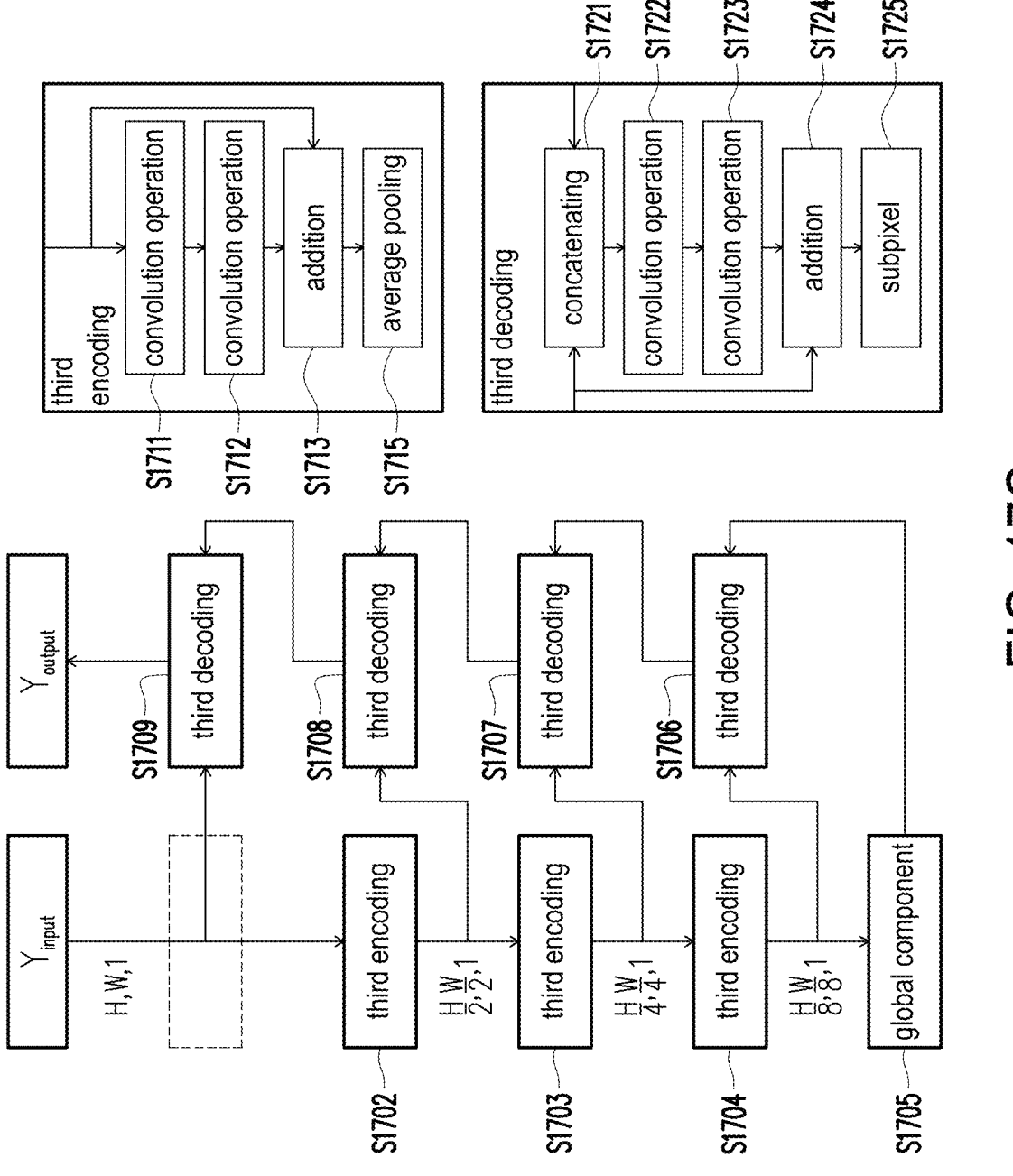
FIG. 17C is a schematic diagram illustrating a network with only scaling according to an embodiment of the disclosure.

FIG. 17C is a schematic diagram illustrating a network with only scaling according to an embodiment of the disclosure. Referring to FIG. 17A and FIG. 17C, the third encoding of this embodiment is the same as the first encoding in the implementation of FIG. 17A, and the third decoding of this embodiment is the same as the first decoding in the implementation of FIG. 17A. The difference from FIG. 17A is that the network of FIG. 17C does not perform the packing step in the implementation of FIG. 17A.

Figure 17D:
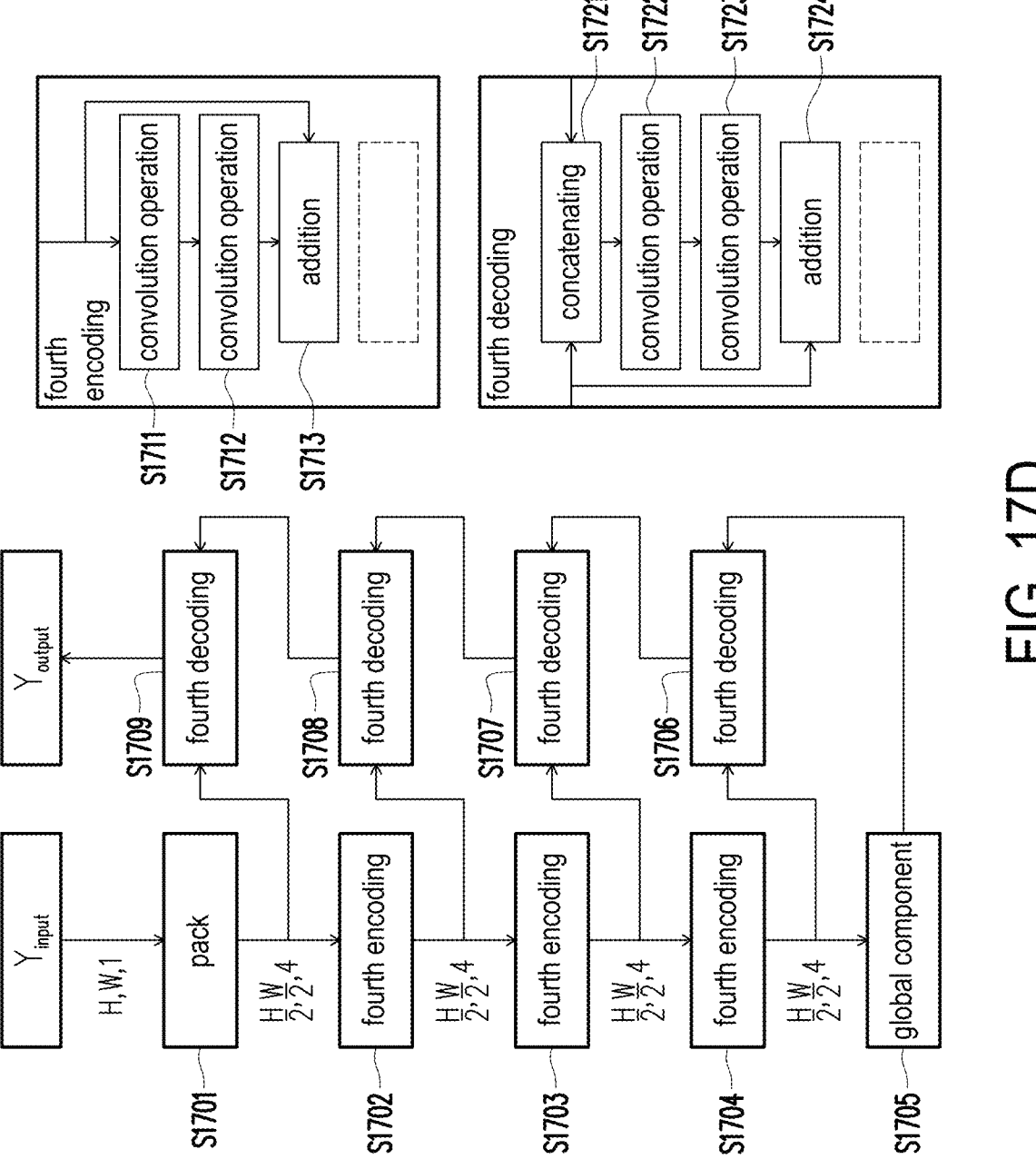
FIG. 17D is a schematic diagram illustrating a network with only packing according to an embodiment of the disclosure.

FIG. 17D is a schematic diagram illustrating a network with only packing according to an embodiment of the disclosure. Referring to FIG. 17A and FIG. 17D, the difference between the implementation of this embodiment and the implementation of FIG. 17A is that, compared with the first encoding and the first decoding in the implementation of FIG. 17A, the fourth encoding of this embodiment does not perform an average pooling as in the first encoding, and the fourth decoding of this embodiment does not perform subpixeling as in the first decoding.

Figure 18A:
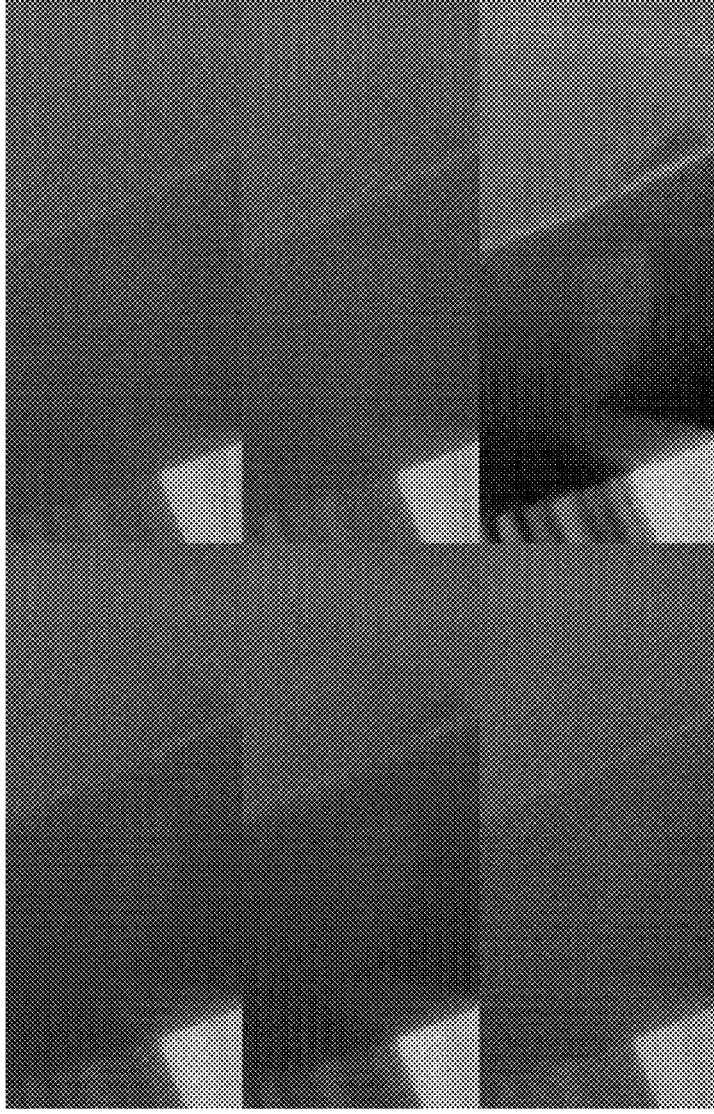
FIG. 18A is a view illustrating an evaluation result after 50 epochs of training according to an embodiment of the disclosure.

FIG. 18A is a view illustrating an evaluation result after 50 epochs of training according to an embodiment of the disclosure. Referring to FIG. 18A, the network of FIG. 17A to FIG. 17D and the network of FIG. 17A were trained 50 times respectively (but the second convolution operation (step S1723) in the first decoding was replaced by the first convolution operation (step S1623) in FIG. 16A, that is, using a shared filter). None of the output images of the networks contained obvious checkerboard artifacts.

FIG. 18B is a view illustrating an evaluation result after 900 epochs of training according to an embodiment of the disclosure. Referring to FIG. 18B, the network of FIG. 17A to FIG. 17D and the network of FIG. 17A were trained 900 times respectively (but the second convolution operation (step S1723) in the first decoding was replaced by the first convolution operation (step S1623) in FIG. 16A, that is, using a shared filter). The output images of the network not using a shared filter all had obvious checkerboard artifacts, but the output images of the network using a shared filter did not have checkerboard artifacts.

To sum up, in the parameter optimizing method of a neural network and the computing apparatus according to the embodiments of the disclosure, the sub-weights of the sub-filters of multiple channels may be determined based on the same shared filter, and the data may be computed using these sub-filters, which allows the same characteristics to be assigned to multiple channels, thereby reducing or avoiding checkerboard artifacts caused by subpixeling or unpacking data.

Although the disclosure has been described based on the embodiments above, the above embodiments are not intended to limit the disclosure. Those skilled in the art may make slight changes and modifications without departing from the spirit and scope of the disclosure. Therefore, the scope of protection of the disclosure shall be defined by the following claims.

What is claimed is:

1. A parameter optimizing method of a neural network, comprising:

obtaining a shared filter, wherein the shared filter comprises a plurality of shared weights;

assigning the shared weights to a plurality of sub-filters, wherein each of the sub-filters corresponds to one of a plurality of channels, each of the sub-filters comprises a plurality of sub-weights, and a size of each of the sub-filters is smaller than or equal to a size of the shared filter;

generating the sub-weights of each of the sub-filters according to assigned shared weights; and performing a computation with at least one input data by using the sub-filters of the channels respectively.

2. The parameter optimizing method of a neural network according to claim 1, wherein assigning the shared weights to the sub-filters comprises:

defining a plurality of areas of the shared filter according to the size of each of the sub-filters, wherein a number of the sub-weights in each of the sub-filters is the same as a number of the areas, a plurality of shared weights located in one area have the same value, and the shared weights in each of the areas have different values;

mapping the sub-filters to the shared filter to generate a mapping result, wherein the mapping result comprises the area of the shared filter to which each of the sub-weights of each of the sub-filters corresponds; and assigning the shared weights according to the mapping result, wherein each selected sub-weight of a corresponding selected area of each of the sub-filters corresponds to at least one of the shared weights in the area mapped.

3. The parameter optimizing method of a neural network according to claim 2, wherein generating the sub-weights of each of the sub-filters according to the assigned shared weights comprises:

for each of the sub-filters, obtaining the sub-weights by adding up the corresponding shared weights in the area of the shared filter to which each selected sub-weight in each selected area is mapped.

4. The parameter optimizing method of a neural network according to claim 2, wherein the sub-filters comprise a first sub-filter and a second sub-filter, and mapping the sub-filters to the shared filter comprises:

setting at least one of the shared weights of the shared filter mapped to a selected area of the first sub-filter to be different from at least one of the shared weights of the shared filter mapped to a selected area of the second sub-filter.

5. The parameter optimizing method of a neural network according to claim 1, wherein the computation is a first convolution operation, the at least one input data comprises a plurality of pieces of first input data corresponding to the channels, and performing the computation with the at least one input data by using the sub-filters of the channels respectively comprises:

performing the first convolution operation on one of the sub-filters and one piece of the first input data respectively according to the corresponding channel to generate a plurality of pieces of first output data corresponding to the channels; and performing a first format conversion on the first output data to generate second output data of a single channel.

6. The parameter optimizing method of a neural network according to claim 5, wherein the number of the channels is N, and performing the first format conversion on the first output data comprises:

assigning first elements at the same position in the pieces of first output data to N adjacent elements in the second output data.

7. The parameter optimizing method of a neural network according to claim 5, wherein before performing the first convolution operation on one of the sub-filters and one piece of the first input data respectively according to the corresponding channel, the parameter optimizing method further comprises:

performing a second format conversion on a first image to generate the first input data corresponding to the channels.

8. The parameter optimizing method of a neural network according to claim 5, wherein before performing the first convolution operation on one of the sub-filters and one piece of the first input data respectively according to the corresponding channel, the parameter optimizing method further comprises:

performing a first encoding on a second image to generate the first input data corresponding to the channels, wherein the first encoding comprises an average pooling or a second format conversion for conversion from a single channel to multiple channels.

9. The parameter optimizing method of a neural network according to claim 5, wherein before performing the first convolution operation on one of the sub-filters and one piece of the first input data respectively according to the corresponding channel, the parameter optimizing method further comprises:

performing at least a second convolution operation on a third image to generate the first input data corresponding to the channels.

10. The parameter optimizing method of a neural network according to claim 1, wherein the computation is a first convolution operation, the at least one input data comprises second input data of a single channel, and performing the computation with the at least one input data by using the sub-filters of the channels respectively comprises:

performing the first convolution operation on the sub-filters and the second input data respectively to generate a plurality of pieces of third output data corresponding to the channels; and performing a first format conversion on the third output data to generate fourth output data of a single channel.

11. The parameter optimizing method of a neural network according to claim 1, wherein after performing the computation with the at least one input data by using the sub-filters of the channels respectively, the parameter optimizing method further comprises:

generating output data, wherein the input data has a first resolution, the output data has a second resolution, and the second resolution is higher than the first resolution, and the size of the shared filter is the same as a size of the output data.

12. A computing apparatus, comprising:

a storage configured to store a program code; and a processor coupled to the storage and configured to load and execute the program code to:

obtain a shared filter, wherein the shared filter comprises a plurality of shared weights;

assign the shared weights to a plurality of sub-filters, wherein each of the sub-filters corresponds to one of a plurality of channels, each of the sub-filters comprises a plurality of sub-weights, and a size of each of the sub-filters is smaller than or equal to a size of the shared filter;

generate the sub-weights of each of the sub-filters according to the assigned shared weights; and perform a computation with at least one input data by using the sub-filters of the channels respectively.

13. The computing apparatus according to claim 12, wherein the processor is further configured to:

define a plurality of areas of the shared filter according to the size of each of the sub-filters, wherein a number of the sub-weights in each of the sub-filters is the same as a number of the areas, a plurality of shared weights located in one area have the same value, and the shared weights in each of the areas have different values;

map the sub-filters to the shared filter to generate a mapping result, wherein the mapping result comprises the area of the shared filter to which each of the sub-weights of each of the sub-filters corresponds; and assign the shared weights according to the mapping result, wherein each selected sub-weight of a corresponding selected area of each of the sub-filters corresponds to at least one of the shared weights in the area mapped.

14. The computing apparatus according to claim 13, wherein the processor is further configured to:

for each of the sub-filters, obtain the sub-weights by adding up the corresponding shared weights in the area of the shared filter to which each selected sub-weight in each selected area is mapped.

15. The computing apparatus according to claim 13, wherein the sub-filters comprise a first sub-filter and a second sub-filter, and the processor is further configured to:

set at least one of the shared weights of the shared filter mapped to a selected area of the first sub-filter to be different from at least one of the shared weights of the shared filter mapped to a selected area of the second sub-filter.

16. The computing apparatus according to claim 12, wherein the computation is a first convolution operation, the at least one input data comprises a plurality of pieces of first input data corresponding to the channels, and the processor is further configured to:

perform the first convolution operation on one of the sub-filters and one piece of the first input data respectively according to the corresponding channel to generate a plurality of pieces of first output data corresponding to the channels; and perform a first format conversion on the first output data to generate second output data of a single channel.

17. The computing apparatus according to claim 16, wherein the number of the channels is N, and the processor is further configured to:

assign first elements at the same position in the pieces of first output data to N adjacent elements in the second output data.

18. The computing apparatus according to claim 16, wherein the processor is further configured to:

perform a second format conversion on a first image to generate the first input data corresponding to the channels.

19. The computing apparatus according to claim 16, wherein the processor is further configured to:

perform a first encoding on a second image to generate the first input data corresponding to the channels, wherein the first encoding comprises an average pooling or a second format conversion for conversion from a single channel to multiple channels.

20. The computing apparatus according to claim 16, wherein the processor is further configured to:

perform at least a second convolution operation on a third image to generate the first input data corresponding to the channels.

21. The computing apparatus according to claim 12, wherein the computation is a first convolution operation, the at least one input data comprises second input data of a single channel, and the processor is further configured to:

perform the first convolution operation on the sub-filters and the second input data respectively to generate a plurality of pieces of third output data corresponding to the channels; and perform a first format conversion on the third output data to generate fourth output data of a single channel.

22. The computing apparatus according to claim 12, wherein the processor is further configured to:

generate output data, wherein the input data has a first resolution, the output data has a second resolution, and the second resolution is higher than the first resolution, and the size of the shared filter is the same as a size of the output data.

* * * * *